US009588683B2

(12) United States Patent
Yairi et al.

(10) Patent No.: US 9,588,683 B2
(45) Date of Patent: *Mar. 7, 2017

(54) DYNAMIC TACTILE INTERFACE

(71) Applicant: Tactus Technology, Inc., Fremont, CA (US)

(72) Inventors: Micah B. Yairi, Fremont, CA (US); Craig Ciesla, Fremont, CA (US); Curtis Ray, Fremont, CA (US); Michael Jastrzebski, Fremont, CA (US); Amy Lai Wong, Fremont, CA (US); Simona Wong, Fremont, CA (US); Jonathon Jenkins, Fremont, CA (US); Nathan Knapp, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/807,750

(22) Filed: Jul. 23, 2015

(65) Prior Publication Data
US 2015/0331525 A1    Nov. 19, 2015

Related U.S. Application Data

(63) Continuation of application No. 14/081,519, filed on Nov. 15, 2013, now Pat. No. 9,128,525.
(Continued)

(51) Int. Cl.
*G06F 3/0488* (2013.01)
*G06F 3/045* (2006.01)
(Continued)

(52) U.S. Cl.
CPC .......... *G06F 3/04886* (2013.01); *F04B 43/10* (2013.01); *F04B 43/113* (2013.01);
(Continued)

(58) Field of Classification Search
CPC .. F04B 43/08–43/1136; F04B 45/06–45/0736; G06F 3/016; G06F 3/041; F15B 15/106
(Continued)

(56) References Cited

U.S. PATENT DOCUMENTS 2,885,967 A    5/1959    C et al.
3,034,628 A    5/1962    Wadey
(Continued)

FOREIGN PATENT DOCUMENTS

CN    1260525 A    7/2000
CN    1530818 A    9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Patrick F Marinelli
(74) *Attorney, Agent, or Firm* — Jeffrey Schox; Padowithz Alce

(57) ABSTRACT

One variation of a dynamic tactile interface includes: a substrate defining a fluid channel and a fluid conduit fluidly coupled to the fluid channel; a tactile layer comprising a peripheral region and a deformable region, the peripheral region coupled to the substrate, and the deformable region arranged over the fluid conduit, disconnected from the substrate, and operable between a retracted setting and an expanded setting, the deformable region elevated above the peripheral region in the expanded setting; a tube comprising a first end fluidly coupled to the fluid channel and constrained relative to the substrate; a volume of fluid within the
(Continued)

tube; and a rotary actuator coupled to the tube remote from the first end and configured to transition the deformable region from the retracted setting to the expanded setting by winding the tube to displace a portion of the volume of fluid within the tube into the fluid channel.

6 Claims, 9 Drawing Sheets

Related U.S. Application Data

(60) Provisional application No. 61/727,083, filed on Nov. 15, 2012.

(51) Int. Cl.
*G06F 3/044* (2006.01)
*G06F 3/01* (2006.01)
*G06F 3/041* (2006.01)
*F04B 45/073* (2006.01)
*F04B 43/113* (2006.01)
*F04B 43/10* (2006.01)

(52) U.S. Cl.
CPC ........ *F04B 45/073* (2013.01); *F04B 45/0736* (2013.01); *G06F 3/016* (2013.01); *G06F 3/044* (2013.01); *G06F 3/045* (2013.01); *G06F 3/0416* (2013.01); *G06F 2203/04809* (2013.01)

(58) Field of Classification Search
USPC ................ 137/147–150.5; 92/89, 90; 60/533
See application file for complete search history.

(56) References Cited

U.S. PATENT DOCUMENTS

| | | |
|---|---|---|
| 3,441,111 A | 4/1969 | P |
| 3,453,967 A * | 7/1969 | Durfee ................ A61M 1/1037 417/480 |
| 3,490,733 A | 1/1970 | Jean |
| 3,659,354 A | 5/1972 | Sutherland |
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,181,476 A | 1/1980 | Malbec |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,090,297 A | 2/1992 | Paynter |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,470,212 A | 11/1995 | Pearce |
| 5,488,204 A | 1/1996 | Mead et al. |
| 5,496,174 A | 3/1996 | Garner |
| 5,496,175 A | 3/1996 | Oyama et al. |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |

(56) References Cited

U.S. PATENT DOCUMENTS

| | | |
|---|---|---|
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |

(56) References Cited

U.S. PATENT DOCUMENTS

| | | |
|---|---|---|
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 | 7/2015 | Karakotsios |
| 9,116,617 B2 | 8/2015 | Ciesla et al. |
| 9,128,525 B2* | 9/2015 | Yairi ............... G06F 3/016 |
| 9,274,612 B2 | 3/2016 | Ciesla et al. |
| 9,274,635 B2 | 3/2016 | Birnbaum |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |

(56) References Cited

U.S. PATENT DOCUMENTS

| | | |
|---|---|---|
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1* | 7/2009 | Ciesla ............... G06F 3/04886 345/174 |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala Vazquez et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0242749 A1 | 10/2011 | Huang et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |

(56) References Cited

U.S. PATENT DOCUMENTS

2015/0205419 A1 7/2015 Calub et al.
2015/0293591 A1 10/2015 Yairi et al.

FOREIGN PATENT DOCUMENTS

| | | | |
|---|---|---|---|
| CN | 1882460 | A | 12/2006 |
| EP | 2000884 | A1 | 12/2008 |
| GB | 190403152 | A | 12/1904 |
| GB | 108771 | A | 8/1917 |
| GB | 1242418 | A | 8/1971 |
| JP | s63164122 | A | 7/1988 |
| JP | 10255106 | | 9/1998 |
| JP | H10255106 | | 9/1998 |
| JP | 2006268068 | A | 10/2006 |
| JP | 2006285785 | A | 10/2006 |
| JP | 200964357 | A | 3/2009 |
| JP | 2009064357 | A | 3/2009 |
| JP | 2010039602 | A | 2/2010 |
| JP | 2010072743 | A | 4/2010 |
| JP | 2011508935 | A | 3/2011 |
| KR | 20000010511 | | 2/2000 |
| KR | 100677624 | B | 1/2007 |
| KR | 20090023364 | | 11/2012 |
| WO | 2004028955 | A2 | 4/2004 |
| WO | 2006082020 | A1 | 8/2006 |
| WO | 2008037275 | A | 4/2008 |
| WO | 2009002605 | A | 12/2008 |
| WO | 2009044027 | A2 | 4/2009 |
| WO | 2009067572 | A2 | 5/2009 |
| WO | 2009088985 | A1 | 7/2009 |
| WO | 2010077382 | A | 7/2010 |
| WO | 2010078596 | A | 7/2010 |
| WO | 2010078597 | A | 7/2010 |
| WO | 2011003113 | A | 1/2011 |
| WO | 2011087816 | A | 7/2011 |
| WO | 2011087817 | A | 7/2011 |
| WO | 2011108382 | A1 | 9/2011 |
| WO | 2011112984 | A | 9/2011 |
| WO | 2011118382 | A1 | 9/2011 |
| WO | 2011133604 | A | 10/2011 |
| WO | 2011133605 | A | 10/2011 |
| WO | 2013173624 | A2 | 11/2013 |
| WO | 2014047656 | A2 | 3/2014 |

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9. Materials.pdf>.

Jeong et al., "Tunable Microdoublet Lens Array," Optical Society of America, Optics Express; vol. 12, No. 11. May 31, 2004, 7 Pages.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp? sourceid=chrome-instant&ion=1&espv=2&ie=UTF-8#q=materials-05-01125.pdf> .

Preumont, A. Vibration Control of Active Structures: An Introduction, Jul. 2011.

* cited by examiner

DYNAMIC TACTILE INTERFACE

CROSS-REFERENCE TO RELATED APPLICATIONS

The application is a continuation of co-pending U.S. patent application Ser. No. 14/081,519, filed 15 Nov. 2013, which claims the benefit of U.S. Provisional Patent Application No. 61/727,083, filed on 15 Nov. 2012, both of which are incorporated in their entirety by this reference.

This application is further related to U.S. patent application Ser. No. 11/969,848, filed on 4 Jan. 2008, U.S. patent application Ser. No. 13/414,589, filed 7 Mar. 2012, U.S. patent application Ser. No. 13/456,010, filed 25 Apr. 2012, U.S. patent application Ser. No. 13/456,031, filed 25 Apr. 2012, U.S. patent application Ser. No. 13/465,737, filed 7 May 2012, and U.S. patent application Ser. No. 13/465,772, filed 7 May 2012, all of which are incorporated in their entireties by this reference.

TECHNICAL FIELD

This invention relates generally to touch-sensitive displays, and more specifically to a new and useful dynamic tactile interface in the field of touch-sensitive displays.

DESCRIPTION OF THE EMBODIMENTS

The following description of the embodiment of the invention is not intended to limit the invention to these embodiments, but rather to enable any person skilled in the art to make and use this invention.

1. Dynamic Tactile Interface

Figure 1A:
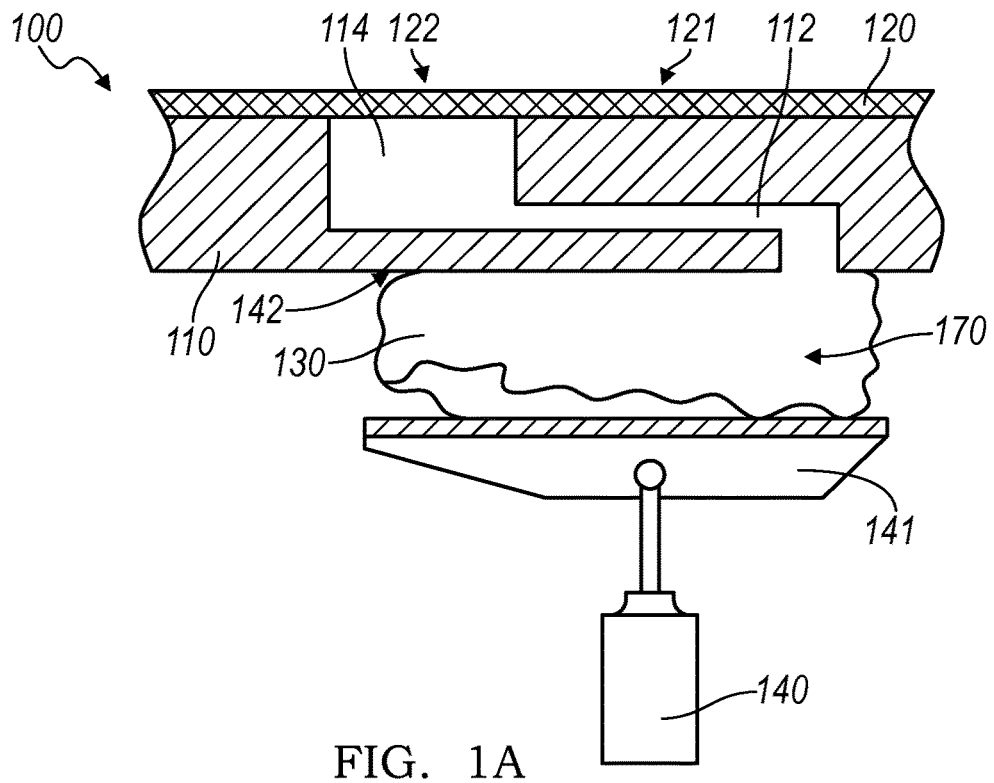
FIGS. 1A and 1B are schematic representations of a dynamic interface device.
Figure 1B:
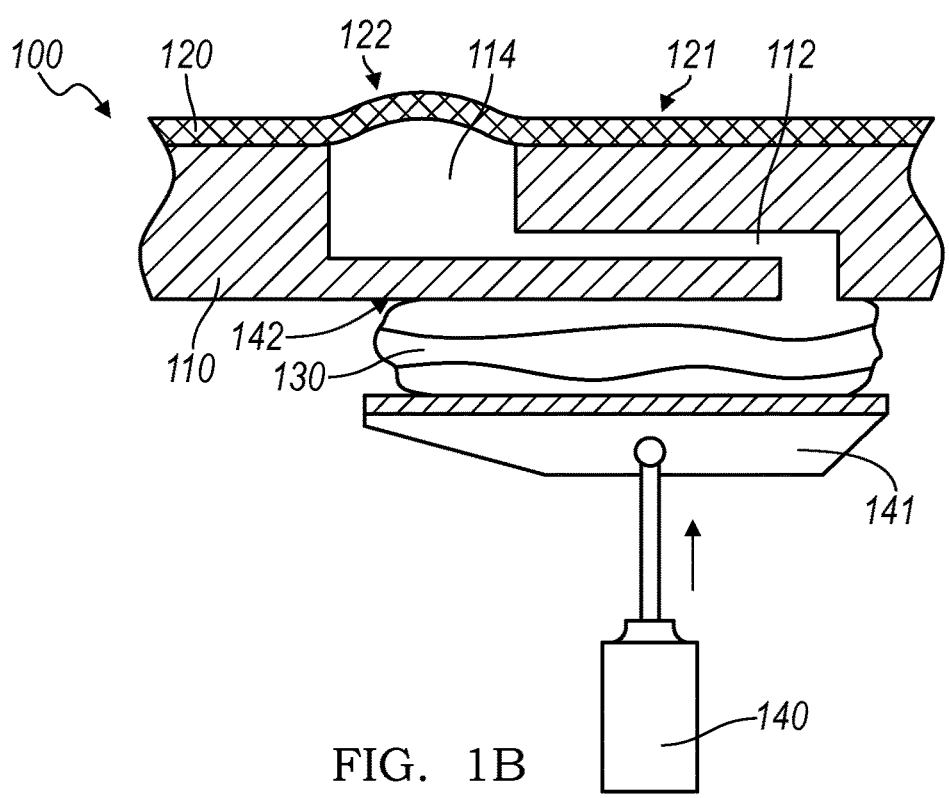
Figure 2:
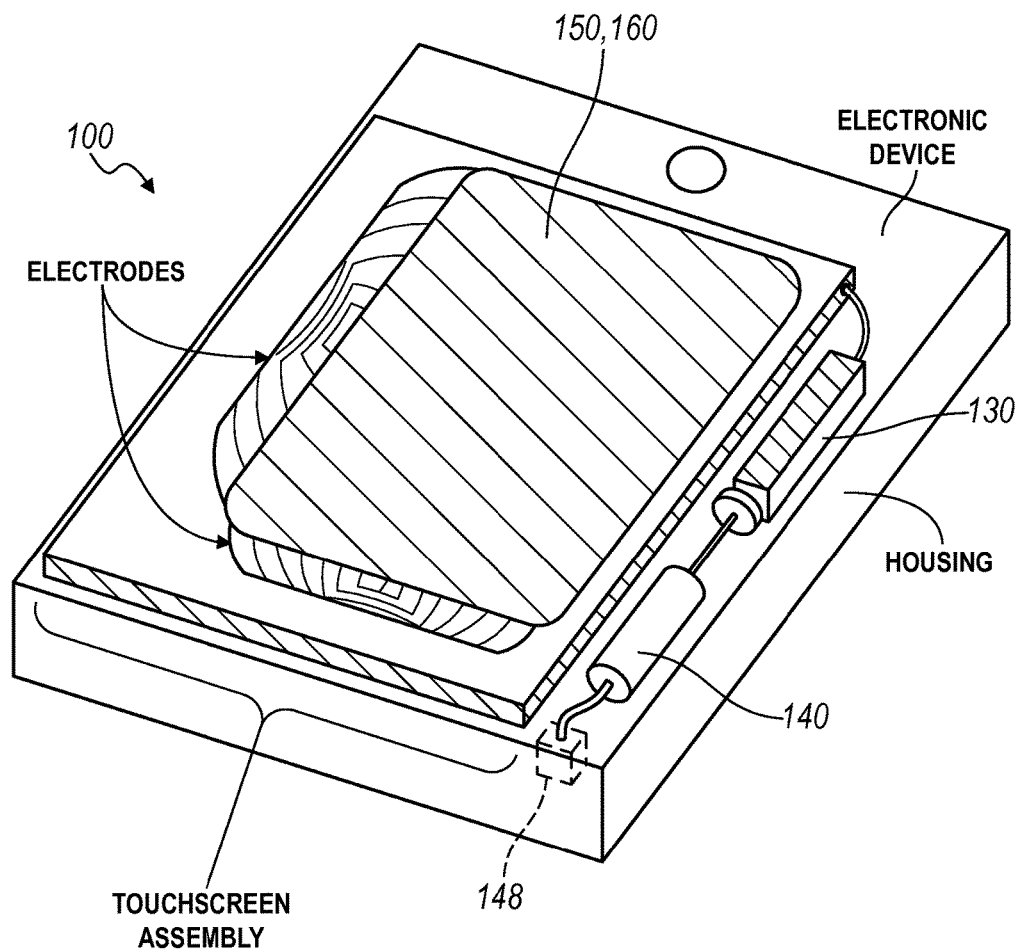
FIG. 2 is a schematic representation of a dynamic interface device incorporated into an electronic device in accordance with a variation of the dynamic interface device.

As shown in FIGS. 1 and 2, a dynamic tactile interface includes: a substrate 110, a tactile layer 120, a volume of fluid 170, and a displacement device 140. The substrate 110 defines a fluid channel 112 and a fluid conduit 114 fluidly coupled to the fluid channel 112. The tactile layer 120 includes including a peripheral region 121 and a deformable region 122, the peripheral region 121 coupled to the substrate 110, and the deformable region 122 arranged over the fluid conduit 114, disconnected from the substrate 110, and operable between a retracted setting and an expanded setting, the deformable region 122 elevated above the peripheral region 121 in the expanded setting. The displacement device 140 is configured to displace a portion of the volume of fluid 170 into the fluid channel 112 to transition the deformable region 122 from a retracted setting to an expanded setting. The dynamic tactile interface can also include a reservoir 130 coupled to the fluid channel 112 and configured to contain a portion of the volume of fluid 170, and the displacement device 140 can manipulate the reservoir 130 to displace fluid from the reservoir 130 into the fluid channel 112.

2. Applications

The dynamic tactile interface functions as a tactilely dynamic interface surface for an electronic device to provide intermittent tactile guidance to an input region on the device. For example, the dynamic tactile interface can be integrated or applied over a touchscreen of a mobile computing device to provide tactile guidance to a user interacting with the touchscreen to control the device. In one implementation, the deformable region 122 is planar or flush with the peripheral region 121 in the retracted setting, and raised above the peripheral region 121 to define a tactilely distinguishable feature on the tactile surface in the expanded setting. In this implementation, the deformable region 122 can coincide with (i.e., be arranged over) an input key rendered on a display 150 of the device such that the deformable region 122 mimics a raised physical hard key in the expanded setting, thus tactilely guiding selection of the corresponding input key into a touch sensor of the device. The deformable region 122 can then be retracted to yield a flush, smooth, and/or continuous surface and substantially minimal optical distortion across the deformable and peripheral regions. For example, the displacement device 140 can transition the deformable region 122 into the expanded setting when the user is providing or has been prompted to provide an input into the touchscreen, such as with a finger or with a stylus. In this example, the displacement device 140 can then transition the deformable region 122 back to the retracted setting when the user is no longer providing or has not been prompted to provide an input into the touchscreen—or when the input key is no longer display adjacent the deformable region 122—such that the tactile surface is substantially planar or flush with the peripheral region, thereby yielding reduced optical distortion of an image output by the display 150 and transmitted through the tactile layer 120.

In various examples, the dynamic tactile interface can be integrated or applied over a display 150 of a mobile computing device, such as over a touchscreen of a tablet, smartphone, laptop computer, desktop computer, personal data assistant (PDA), personal music player (e.g., MP3 player), etc. The dynamic tactile interface can also be incorporated into an automotive dashboard display or console, a television, a personal navigation device, a watch, a home stereo system interface, a lighting or thermostat control system, a machine tool controller, a computer mouse, a computer touchpad, a keyboard or keypad, a gaming controller or console, cooking equipment, or any other suitable electronic and/or digital computing device.

3. Substrate and Tactile Layer

As shown in FIG. 1, the substrate 110 defines a fluid channel 112 and a fluid conduit 114 fluidly coupled to the fluid channel 112. Generally, the substrate 110 functions to support the tactile layer 120 and to distribute fluid from the displacement device 140 and/or from the reservoir 130 to the deformable region 122 to transition the deformable region 122 into the expanded setting. Similarly, the substrate 110 functions to distribute fluid from the deformable region 122 back to the displacement device 140 and/or to the reservoir 130 to transition the deformable region 122 from the expanded setting back into the retracted setting.

The tactile layer 120 of the dynamic tactile interface includes a deformable region 122 and a peripheral region 121 coupled to the substrate 110. The deformable region 122 is arranged over the fluid conduit 114, is disconnected from the substrate 110, and is operable between a retracted setting and an expanded setting. In the retracted setting, the deformable region 122 can be substantially flush with the adjacent peripheral region, and the deformable region 122 can expand outward when fluid is pumped through the fluid channel 112 and the fluid conduit 114 toward the deformable region 122. The deformable region 122 can therefore by elevated above the peripheral region 121 in the expanded setting.

Figure 11A:
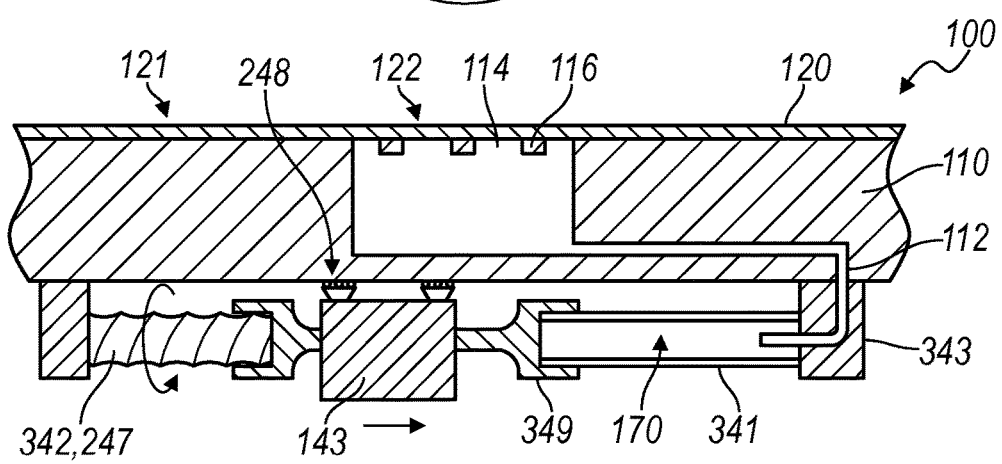
FIGS. 11A and 11B are schematic representations of one variation of the dynamic interface device.
Figure 11B:
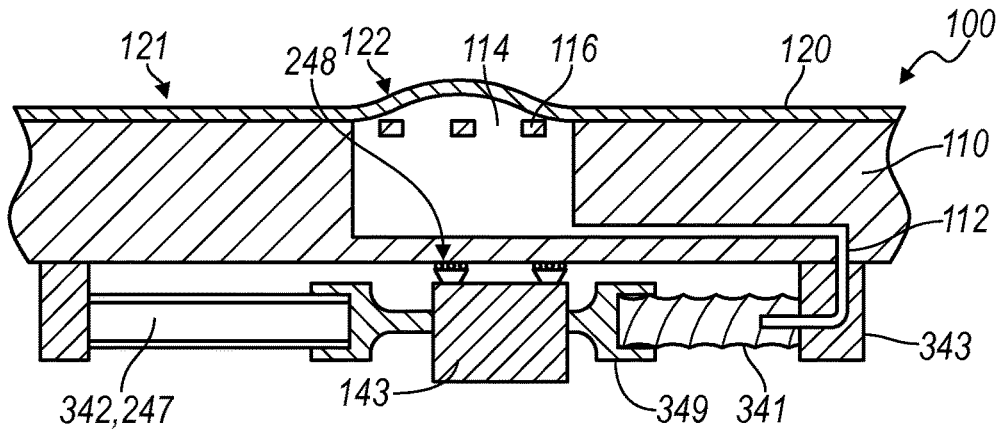

The substrate 110 can also include a support member 116 adjacent the deformable region 122 and configured to support the deformable region 122 against inward deformation, such as in response to an input or other force applied to the tactile surface at the deformable region 122. In this implementation, the support member 116 can define the fluid conduit 114, as shown in FIGS. 11A and 11B, such that the fluid conduit 114 communicates fluid from the fluid channel 112 through the support member 116 and toward the deformable region 122 to transition the deformable region 122 from the retracted setting to the expanded setting.

The tactile layer 120 and substrate can be implemented as described in U.S. patent application Ser. Nos. 11/969,848, 13/414,589, 13/456,010, 13/456,031, 13/465,737, and/or 13/465,772.

However, the tactile layer 120 and the substrate 110 can be of any other form and function in any other way to define the deformable region 122 and to communicate fluid between the deformable region 122 and the displacement device 140 and/or the reservoir 130 to transition the deformable region 122 between the expanded and retracted settings.

4. Displacement Device and Reservoir

The reservoir 130 functions to hold a portion of the volume of fluid 170, and the displacement device 140 functions to displace fluid from the reservoir 130 into the fluid channel 112 to transition the deformable region 122 into the expanded setting. The reservoir 130 can further receive fluid back from the fluid channel 112 to transition the deformable region 122 from the expanded setting back into the retracted setting. The volume of fluid can be water, alcohol, silicone oil, air, or any other suitable type of fluid (e.g., gas or liquid).

The dynamic tactile interface can be a standalone, self-contained system configured for integrated over a touchscreen of a mobile computing device, such as a tablet or a smartphone. Generally, capacitive touchscreens, which commonly incorporate both a capacitive touch sensor and a display 150, may require numerous electrical connections (e.g., electrodes) for column-wise and row-wise sensor traces and for column-wise and row-wise pixel control traces. In this example, these connections may be made along one vertical edge and one horizontal edge of the touchscreen, which yields asymmetric touchscreen layout, as shown in FIG. 2. In one arrangement of the dynamic tactile interface over an asymmetric touchscreen layout, the reservoir 130 and displacement device are coupled to the substrate 110 opposite the tactile layer 120 and opposite the electrical connections when assembled over a touchscreen. Thus, in this arrangement, the assembly of the dynamic tactile interface and the touchscreen can form a substantially symmetric and low-profile tactile touchscreen unit capable of rendering images, capturing user inputs on the tactile surface, and providing tactile guidance on the tactile surface through manipulation of fluid into and out of the deformable region 122. The displacement device 140 and reservoir can therefore be arranged under a region of a touchscreen that affords substantially maximum vertical space or capacity to accommodate the displacement device 140 (and reservoir) over a substantially narrow and elongated footprint, as shown in FIG. 2. In particular, the displacement device 140 (and the reservoir 130) can be realized within a volume of space defining a substantially high aspect ratio inside a mobile computing device. However, the displacement device 140 (and the reservoir 130, etc.) can define any other suitable geometry for application in any other electronic device of any other form.

4.1 Bladder Reservoir

Figure 3A:
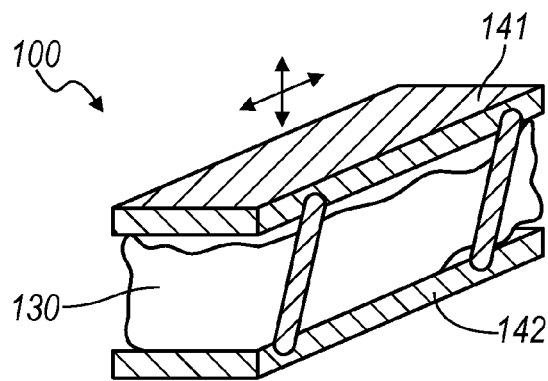
FIGS. 3A and 3B are schematic representations of variations of the dynamic interface device.
Figure 3B:
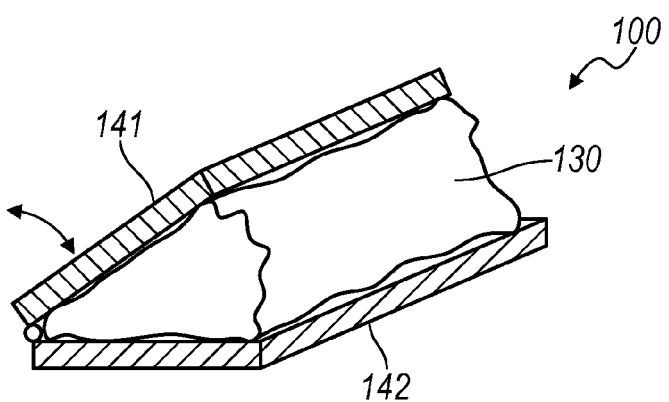

In one variation of the dynamic tactile interface shown in FIGS. 3A and 3B, the reservoir 130 defines a fluid bladder configured to hold fluid. The fluid bladder can be fluidly coupled to the fluid channel 112, such as via a barb. The fluid channel 112, fluid conduit, reservoir, (barb,) deformable region, and bladder can thus define a sealed and enclosed fluid system that fully contains the volume of fluid 170. Similarly, the bladder can be formed over an area of the substrate 110 opposite the tactile layer 120, and the substrate 110 can define a via that bisects the area of the substrate 110 and fluidly couples to the fluid channel 112 to communicate fluid between the reservoir 130 and the fluid channel 112. Thus, the substrate 110, the bladder, the fluid channel 112, the fluid conduit 114, the via, and the deformable region 122 can define a sealed and enclosed fluid system.

Generally, in this variation, the displacement device 140 functions to manipulate the reservoir 130 to displace fluid therefore, thereby transitioning the deformable region 122 from the retracted setting to the expanded setting. For example, the displacement device 140 can compress, clamp, stretch, or otherwise deform the reservoir 130 to adjust its internal volume. The reservoir 130 can be a substantially thin-walled, elastic bladder that yields under compression and/or that stretches under tension. Furthermore, the bladder can be substantially resilient to repeated tension and compression cycles. For example, the reservoir 130 can define an elastomeric bladder, such as a silicone rubber, urethane, or PVC bladder.

The reservoir 130 can also be sized for a prescribed maximum displacement volume to transition the deformable region 122 and/or one or more additional deformable regions of the tactile layer 120 from the retracted setting to a fully-expanded setting. For example, the tactile layer 120 can include a set of twenty-six substantially identical deformable regions arranged in a keyboard layer, each fluidly coupled to the fluid channel 112 via a corresponding fluid conduit. The displacement device 140 can thus manipulate the reservoir 130 to displace fluid into the fluid channel 112, thereby substantially simultaneously transitioning the twenty-six deformable regions from the retracted setting to the expanded setting. In this example, each deformable region in the set can correspond to one alphabetical character (i.e. 'a' through 'z') in an alphabet and to one associated area of a touch sensor coupled to the substrate 110. In this example, displacement of ~0.05 mL of fluid can be prescribed for full transition of one deformable region from the retracted setting to the expanded setting, and the displacement device 140 and the reservoir 130 can therefore be sized to displace a maximum volume of fluid 170 of at least 1.3 mL. Furthermore, the reservoir 130 can be sized for a maximum reduction in internal volume of 50%, such as to extend the life of the reservoir 130 through expansion and retracted cycles. Therefore, in the foregoing example, the reservoir 130 can be configured to contain a maximum of at least 2.6 mL of fluid.

The displacement device 140 can include an actuator coupled to a pair of platens, and the bladder can be sandwiched between the pair of platens such that actuation of the actuator compresses the bladder to displace fluid into the fluid channel 112. Each platen can be substantially rigid, such as defining a stamped steel plate or a molded plastic platter with strengthening ribs. In this implementation, a first platen 141 of the pair can be fixed or otherwise rigidly coupled to the substrate 110, a touchscreen, a housing of the device, or an other component within the device, and the actuator can move the second platen 142 (e.g., in translation) toward the first platen to displace fluid out of the bladder, thereby increasing pressure within the fluid system and transitioning the deformable region 122 from the retracted setting into the expanded setting. Alternatively, both platens (and additionally platens) in the set can be movable relative to each other and/or to the substrate 110 to similarly deform the bladder.

In this foregoing implementation, the bladder can be glued, clamped, adhered, or otherwise mechanically fastened to each of the platens, as shown in FIG. 3A. In this implementation, the displacement device 140 can further retract the platens (i.e., move the platens away from each other) to decrease pressure within the fluid system and/or to create draw a vacuum within the bladder, thereby actively drawing fluid out of the fluid channel 112 and back into the reservoir 130 to retract the deformable region 122. Alternatively, the bladder can be sandwiched between but detached from one or more platens in the set of platens, and elasticity of the bladder (and/or the deformable region 122) can cause the bladder to return to original shape, thereby drawing fluid back out of the fluid channel 112 and transitioning the deformable region 122 back into the retracted setting when the displacement device 140 releases the platens.

Alternatively, the displacement device 140 can include an actuator coupled to a single platen, and the bladder can be sandwiched between the platen and an interior surface of the substrate 110 opposite the tactile layer 120. In this implementation, actuation of the actuator can compress the bladder to displace fluid into the fluid channel 112 (e.g., through the via in the substrate 110), thereby transitioning the deformable region 122 from the retracted setting into the expanded setting. As in the foregoing implementation, in this implementation, the bladder can be glued, adhered, fastened, or otherwise attached to the interior surface of the substrate 110 and/or to the platen. The portion of the substrate 110 can thus function as the second platen 142 described above and cooperate with the first platen to compress, stretch, or otherwise manipulate the bladder when the displacement device 140 is actuated.

However, the bladder can be arranged between a platen and any other surface within the electronic device incorporating the dynamic tactile interface. For example, the bladder can be arranged between a single platen and a planar surface of a battery, a back surface of a touchscreen, or an internal surface of a housing of the device, and the displacement device 140 can compress the bladder and any of the foregoing surfaces to displace fluid out of and/or into the bladder.

As shown in FIG. 3A, the platens can define two opposing linkages in a four-bar linkage such that the opposing surfaces of the platen move parallel one another as the reservoir 130 is compressed and/or expanded. Alternatively, as shown in FIG. 3B, the platens can be hinged to one another such that the reservoir 130 can be pinched or stretched between the pivoting platens. Similarly, at least one platen can be pivotably coupled to an alternative component, such as to a housing that contains a touchscreen and the dynamic tactile interface, to a PCB within the housing, to the substrate 110, or to the touchscreen. A first platen 141 can also be coupled to a flexure that accommodates linear and/or rotary motion of the first platen 141 relative a second platen 142 to enable the platens to move toward and away from each other to thus compress and expand the reservoir 130, respectively.

Figure 4:
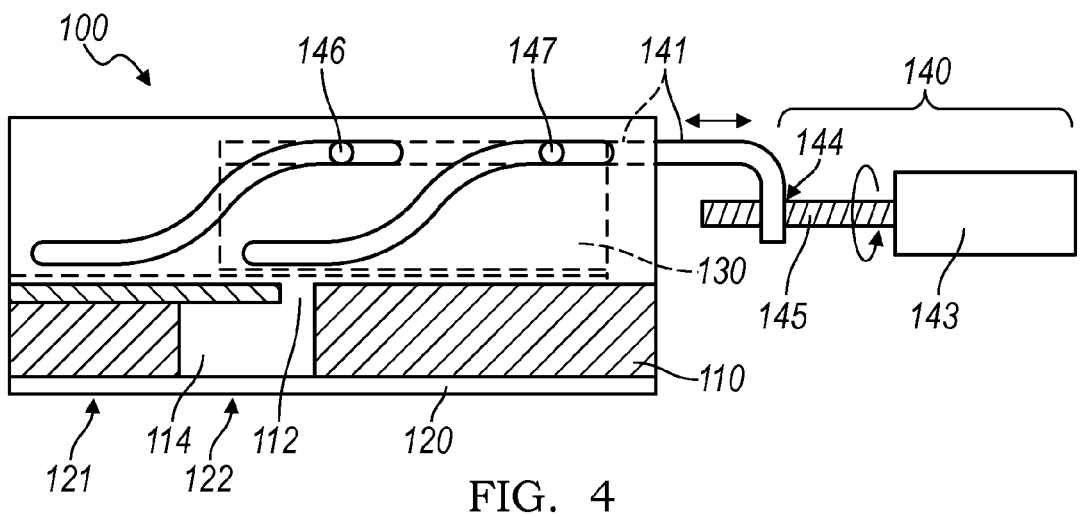
FIG. 4 is a schematic representations of one variation of the dynamic interface device.

As shown in FIG. 4, a first platen 141 can move within a guide channel 144 that constrains the platen in fewer than six° of freedom, wherein motion of the first platen 141 along the guide channel 144 brings the first platen 141 and a second platen 142 closer together or further apart. In this implementation, the guide channel 144 can be a straight guide channel 144 in which the first platen 141 moves linearly within the guide channel. Alternatively, the guide channel 144 can be curved, sinusoidal, curvilinear, or otherwise not wholly linear. For example, as shown in FIG. 4 the guide channel 144 can be sinusoidal with a first asymptote at one end of the guide channel 144 that corresponds with the retracted setting and with a second asymptote at the opposite end of the guide channel 144 that corresponds with the expanded setting. In this example, the asymptotic ends of the guide channel 144 can function as steady state holding positions for the first platen 141, thus requiring minimal holding power and therefore minimal power consumption from the displacement device 140 in a steady-state retracted or expanded setting.

4.1.A Bladder Reservoir & Cam Block 148

Figure 5:
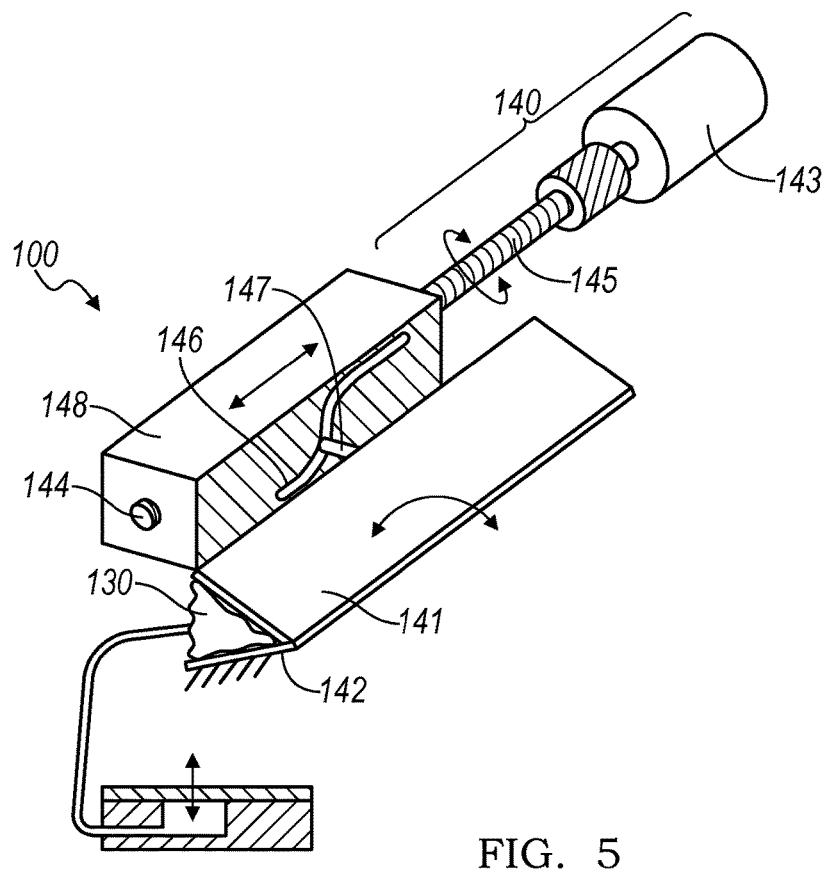
FIG. 5 is a schematic representations of one variation of the dynamic interface device.

In a first implementation of the reservoir 130 that includes a bladder arranged between a first and a second platen 142, the displacement device 140 includes a cam block 148 defining a guide channel, a drive screw that engages the cam, and a rotary actuator 143 (e.g., a motor) configured to drive the cam block 148 along the drive screw by rotating the drive screw. As shown in FIG. 5, the first platen 141 is pivotably mounted to the second platen 142 (or to another component within the dynamic tactile interface and/or electronic device coupled to the second platen 142) and includes a tab 147 that engages the guide channel. As the actuator 143 rotates the drive screw in a first arcuate direction, the cam block 148 moves linearly along a first linear direction, and the first platen 141 pivots about its hinge toward the second platen 142 as the tab 147 follows the guide channel. As the angle between the first and second platens decreases, the platens compress the reservoir 130, drive fluid out of the reservoir 130 and into the fluid channel 112, and thus transition the deformable region 122 from the retracted setting into the expanded setting. Similarly, as the actuator 143 rotates the drive screw in a second arcuate direction opposite the first arcuate direction, the cam block 148 moves linearly in a second linear direction opposite the first linear direction, the tab 147 moves vertically upward to follow the guide channel, and the first platen 141 is driven away from the second platen 142 to stretch the reservoir 130 and thus transition the deformable region 122 from the expanded setting to the retracted setting. The displacement device 140 can further incorporate a second driven or passive cam block 148 across the first platen 141 opposite the cam block 148, wherein the second cam block 148 engages a second tab 147 on the first platen 141 such that the first platen 141 can be driven toward the second platen 142 in linear translation rather than in rotation (i.e. by pivoting about a hinge).

In this implementation, the drive screw can be a single lead acme screw, a double lead acme screw, or any other suitable type of screw. The drive screw can be directly or indirectly coupled to the actuator on one end, such as with a flex coupling or a universal joint. The drive screw can be further supported on an opposite end by a bushing or bearing, such as mounted to the substrate 110 opposite the tactile layer 120 or mounted to the housing of the electronic device that includes the dynamic tactile interface. The cam block 148 can include a circumferential or partial nut that engages one or more threads of the drive screw, or the cam block 148 can include a tab 147 that engages a trough in the lead screw thread to drive the cam block 148 fore and aft as the drive screw rotates. The actuator can be rigidly mounted to the substrate 110 opposite the tactile layer 120 or mounted to the housing of the electronic device that includes the dynamic tactile interface. For example, the actuator can be bonded to the back of the substrate 110 with an epoxy-based adhesive. Alternatively, the actuator can be flexibly mounted, such as retained by a soft (e.g., rubber) motor mount that accommodates blemishes within the drive train as the lead screw 145 rotates. However, the lead screw 145, cam block 148, and actuator can interface and can be mounted in any other suitable way within the dynamic tactile interface and/or within the electronic device to manipulate fluid into and/or out of the fluid channel 112.

In this implementation, the actuator can be an electric motor selected to meet a requisite torque required to compress and/or stretch the reservoir 130, to meet a requisite transition time between the retracted and expanded settings for one or more deformable regions, for a peak or constant supplied voltage, current, or power limit from the electronic device, to limit stress on the reservoir 130 or the substrate 110, etc. For example, the actuator can be selected to enable transition between the retracted and expanded setting at the deformable region 122 within two seconds. Alternatively, the actuator can be selected to enable displacement of 1 mL per second, to match a 3V nominal power supply within the electronic device, for a maximum stall current of 100 mA, or for a peak torque of 1 mNm. The actuator can also be an electric gearhead motor with a gear ratio matched to the pitch of the drive screw to meet one or more of the foregoing criteria. For example, the drive screw 145 can be a lead screw with a 0.025" pitch and the motor can include a planetary gearhead that converts a nominal motor speed of 20,000 rpm to 400 rpm, thus displacing the cam block 148.5" every three seconds. Alternatively, the actuator can be a shape memory alloy (e.g., nitinol) motor, a piezoelectric motor, or any other suitable type or size of actuator with or without a geared output.

As described above, the guide channel 146 can be a linear guide channel. Alternatively, the guide channel 146 can be curvilinear or sinusoidal. For example, the guide channel 146 can include a half-sinusoid section that terminates at each end with a linear segment, as shown in FIG. 4. In this example, a first linear segment of the guide can correspond to the retracted setting, a second linear segment opposite the half-sinusoid can correspond to the expanded setting, wherein the first and second linear segments fully support the tab 147 or cam follower coupled to the first platen 141 such that the actuator does not draw power to hold the deformable region 122 in either the retracted setting or the expanded setting. The actuator can thus draw power only drive tab 147 across the half-sinusoid section.

4.1.B Bladder Reservoir & Hinged Platens

Figure 6A:
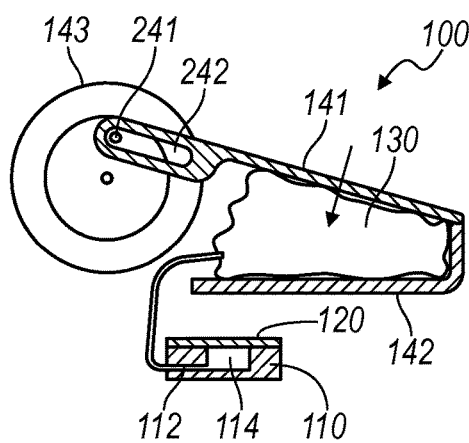
FIGS. 6A and 6B are schematic representations of one variation of the dynamic interface device.
Figure 6B:
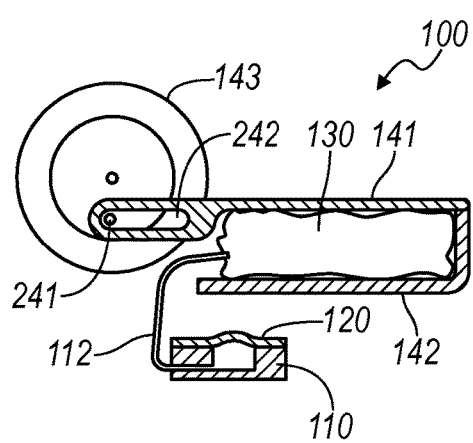

In a second implementation of the reservoir 130 that includes a bladder arranged between a first and a second platen 142, the displacement device 140 includes an electric gearhead motor with an eccentric drive pin 241 configured to engage an elongated slot 242 in a tab 147 extending from a first platen 141 pivotably mounted to the second platen 142 (or to another component within the dynamic tactile interface and/or electronic device), as shown in FIGS. 6A and 6B. In this implementation, a first arcuate position of the eccentric drive pin 241 can correspond to the retracted setting, and a second arcuate position of the eccentric drive pin 241 can correspond to the retracted setting. For example, the first and second arcuate positions can be offset by 180°, and the eccentric drive pin 241 translate from a first linear position to a second linear position and back to the first linear position within the elongated slot 242 as the output shaft 146 of the motor rotates through a 180° arc, as shown in FIG. 6A. In particular, in this example, as the output shaft 146 of the motor rotates, the eccentric drive pin 241 first moves toward the innermost end of the elongated slot 242 in the tab, thus decreasing the angle between the first and second platens. At approximately 90° from the first arcuate position, the motor applies a peak torque to the tab, and the eccentric drive pin 241 begins to move back toward the outermost end of the elongated slot 242. The output shaft 146 of the motor continues to rotate to the second arcuate position 180° from the first arcuate position at which point the motor stops, as shown in FIG. 6B.

In this implementation, the length of the elongated slot 242 and the position of the centerline of the motor relative to the slot can be such that the eccentric drive pin 241 reaches a linear displacement limit within the elongated slot 242 at the outmost end of the elongated slot 242 at the first position and the second position that is 180° offset from the first position. The elongated stop can thus brake the motor at the limits of the expanded and retracted settings. As shown in FIG. 2, a motor controller 148 (and/or processor) electrically coupled to the motor can further measure current draw of the motor and determine that the motor has reached an endstop when the actual current draw exceeds a threshold current draw, and the motor controller 148 can cut power to the motor accordingly. Alternatively, the motor or motor output shaft 146 can be coupled to an encoder, limit switch, potentiometer, or other sensor that feeds position data to the motor controller 148 (and/or processor) to identify travel limits of the motor output shaft 146 and/or offset shaft.

In this implementation, the length of the elongated slot 242 and the position of the centerline of the motor relative to the slot can also be such that the eccentric drive pin 241 is limited to less than 180° of rotation. Generally, the length of the elongated slot 242 and the position of the centerline of the motor relative to the slot can define maximum travel limits of the eccentric drive pin 241 such that a force applied to the first platen 141 by the reservoir 130 translates into substantially no torque applied to the eccentric drive pin 241 by the tab 147 or the elongated slot 242 in either the expanded or retracted settings. This configuration can enable the displacement device 140 to maintain both the expanded and retracted settings substantially without additional power draw from the motor.

The gearhead motor can be configured to move from one extreme travel position to an opposite extreme travel position (e.g., 180° of rotation or less) within a desired setting transition time. For example, the gearhead motor can complete a full rotation in six seconds and slightly less than 180° of rotation slightly less than three seconds. In this example, the motor can include a gearhead that converts a nominal motor speed of ~20,000 rpm to ~360 rpm with a 56:1 planetary gear set.

4.1.C Bladder Reservoir & Four-Bar Linkage

Figure 7:
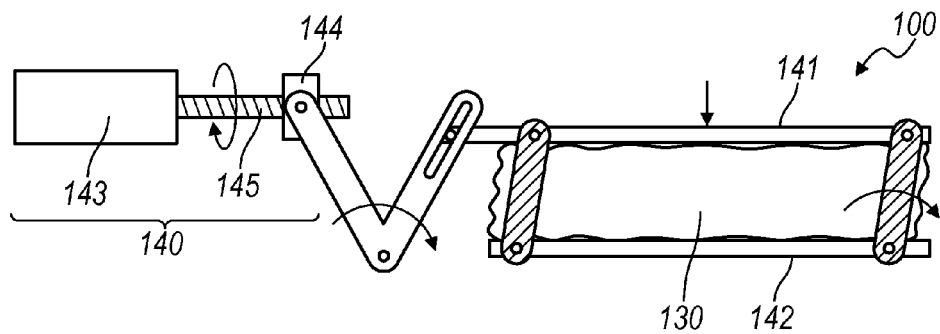
FIG. 7 is a schematic representations of one variation of the dynamic interface device.

In a third implementation of the reservoir 130 that includes a bladder arranged between a first and a second platen 142, the displacement device 140 includes a set of linkages that couple to the first and second platen to form a bar linkage such that the first platen 141 moves parallel to the second platen 142 as the displacement device 140 transitions the deformable region 122 between settings. The displacement device 140 further includes a rotary actuator 143, a lever arm, and a lead screw coupled to the lever arm via a nut 144, and the lead screw and the lever arm can to translate rotary motion of the actuator into translation of the first platen 141 relative the second platen 142, as shown in FIG. 7.

4.1.D Bladder Reservoir & Guide Channel

In a fourth implementation similar to the third implementation of the reservoir 130 that includes a bladder arranged between a first and a second platen 142, the displacement device 140 includes a carriage with offset guide channels 144, each guide channel 144 configured to engage a tab 147 extending from the first platen 141. The displacement device 140 further includes a motor, lead screw, lever arm, and/or nut 144 configured to displace the first platen 141 along the guide channel 144 to reduce or increase the distance between the parallel faces of the first and second platens, thus compressing and stretching the reservoir 130, respectively, as shown in FIG. 4.

As described above, the guide channels 144 can define linear guide channels 144. Alternatively, the guide channels 144 can be curvilinear or sinusoidal in section, such as described above. The guide channels 144 can also be identical and offset to enable broad faces of the first and second platens to remain parallel between settings, or the guide channels 144 can be dissimilar such that broad faces of the first and second platens translate linearly and arcuately between settings.

In the third and forth implementations of the first variation, the actuator can be an electric gearhead motor or any other suitable type of motor, and the drive screw can be an acme lead screw or any other suitable type of lead screw. The motor can be directly or indirectly coupled to the drive screw (e.g., via a flex coupling or a universal joint), and the drive screw can directly engage the carriage or the first platen 141 or engage the first platen 141 via a lever arm, nut 144, or other suitable component.

However, the displacement device 140 of the foregoing implementations can include any other component and define any other configuration to manipulate the reservoir 130 to thereby transition the deformable region 122 between retracted and expanded settings. The dynamic tactile interface can also include any number of similar or dissimilar displacement devices and/or reservoirs configured to transition a multiple fluidly coupled or fluidly discrete deformable regions between expanded and retracted settings.

4.2 Bellows

Figure 8A:
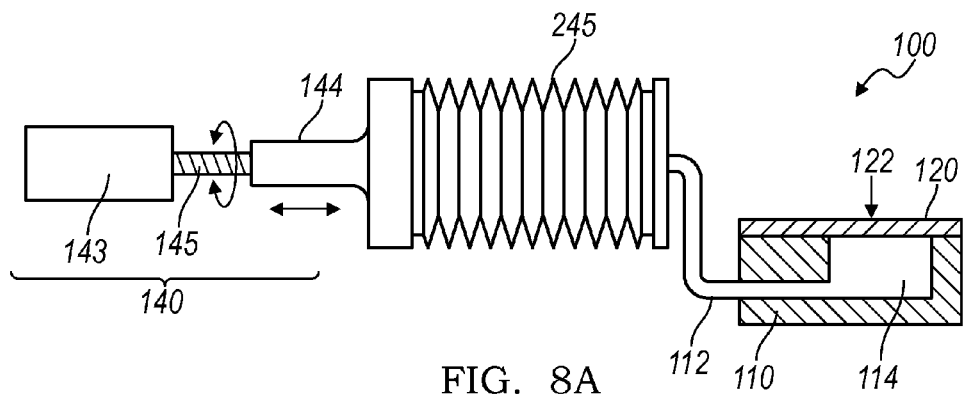
FIGS. 8A and 8B are schematic representations of one variation of the dynamic interface device.
Figure 8B:
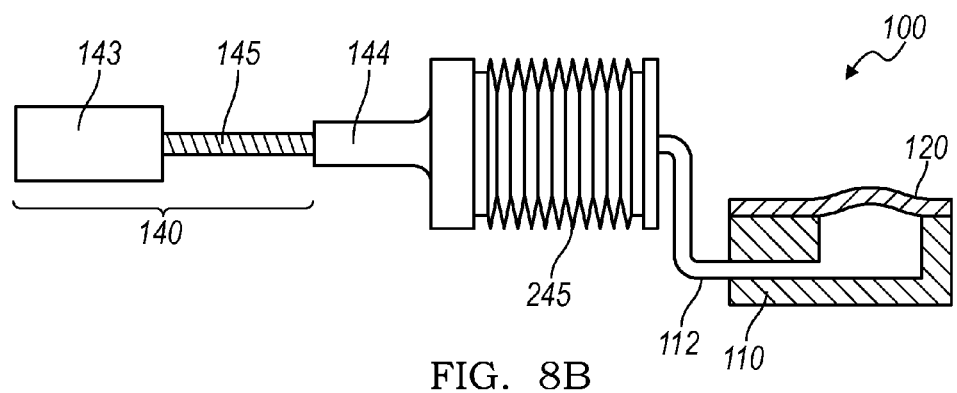

In another variation of the dynamic tactile interface, the reservoir 130 includes a bellows 245 configured to hold fluid, as shown in FIGS. 8A and 8B. The bellows 245 can be fluidly coupled to the fluid channel 112 via a junction block 343, barb, and/or via, etc., and the combination of any of the foregoing components with the fluid channel 112, the fluid conduit 114, the bellows 245, and the deformable region 122 can define a sealed and enclosed fluid system.

In one implementation, the bellows 245 includes a metallic structure, such as a stainless steel, electron-beam welded structure. Alternatively, the bellows 245 can be a plastic or polymer structure, such as a blow-molded PVC structure. The bellows 245 can be circular in cross section, rectangular in cross section, or of any other suitable cross section. The bellows 245 can also be elongated, squat, or of any other suitable form or geometry. Furthermore, like the bladder described above, the bellows 245 can be sized for a requisite total fluid displacement between retracted and expanded settings.

In this second variation of the reservoir 130 that includes a bellows 245, the displacement device 140 can include a linear actuator that advances and retracts the bellows 245 to expand and retract the deformable region 122, respectively. The linear actuator of the displacement device 140 can include a rotary actuator 143 coupled to any one or more of a bellcrank, a cam, a lead screw paired with a nut 144, or any other suitable device configured to translate rotary motion into linear motion, as shown in FIG. 8A. Alternatively, the linear actuator can be a linear motor, a solenoid, or any other suitable type of actuator. Generally, the bellows 245 can be captured on one end, and the linear actuator can apply a compressive and/or tensile force to the opposite end of the bellows 245 to manipulate the internal volume of the bellows 245.

The displacement device 140 can also include a carriage that maintains alignment of the bellows 245 throughout its travel. The carriage, bellows 245, and/or linear actuator (e.g., rotary actuator 143 and mechanism) can further include a mechanical stop at each end of a desired travel limit such that a linear actuator controller (and/or processor) can monitor current draw of the linear actuator to determine the position thereof, as described above. In one example, the bellows 245 can be a squat round bellows 245 coupled to a rotary actuator 143 via a lead screw and bellcrank, wherein endstops arranged on the lead screw define travel limits of the displacement device 140 and bellows 245. In another example, a first end of the bellows 245 is fixed (e.g., rigidly coupled to the substrate 110, such as through the touch sensor and/or the display 150), and a second end of the bellows 245 opposite the first end runs in a track parallel to the axis of the bellows 245. In this example, a lead screw is arranged parallel and offset from the track, is supported near the first end of the bellow, and runs through a nut 144 coupled to the second end of the bellows 245. Thus, in this example, the actuator 143 spins the lead screw to drive the second end of the bellows 245 toward and away from the first end to expanded and retract the deformable region 122, respectively.

However, the reservoir 130 that includes a bellows 245 can be implemented in any other way and can be manipulated between settings in any other way and by any other suitable displacement device to transition the deformable region 122 between settings.

4.3 Coiled Tube

In another variation of the dynamic tactile interface, the reservoir 130 includes a tube defining a first end fluidly coupled to the fluid channel 112 and constrained relative to the substrate 110, and the displacement device 140 includes a rotary actuator 143 coupled to the tube 341 remote from the first end and configured to transition the deformable region 122 from the retracted setting to the expanded setting by winding the tube 341 to displace a portion of the volume of fluid 170 within the tube 341 into the fluid channel 112.

For example, in this variation, the reservoir 130 of the dynamic tactile interface includes: a tube 341 including a first end and a second end opposite the first end, the first end constrained and defining an outlet; a cap 349 coupled to the second end of the tube 341. In this example, the volume of fluid 170 is arranged within the tube 341. Furthermore, the displacement device 140 includes: a rotary actuator 143 including an output shaft 146 coupled to the second end of the tube 341 and configured to wind the tube 341 to displace a portion of the volume of fluid 170 from the tube 341; and a balance spring 247 coupled to the second end of the tube 341 and configured to balance a torque applied by the tube 341 to the output shaft 146 of the rotary actuator 143.

Figure 9A:
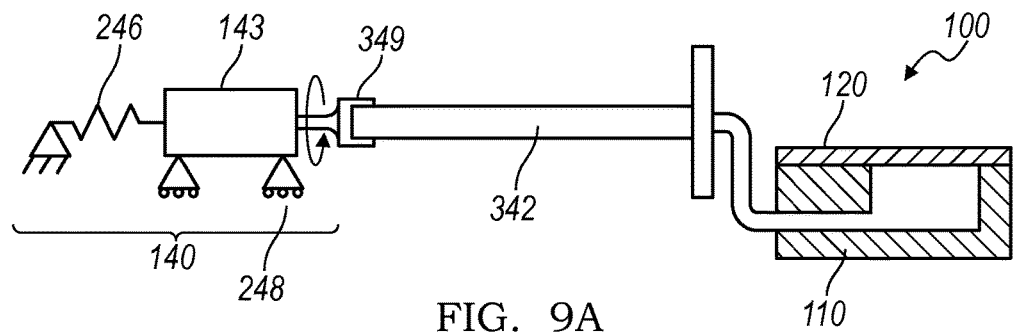
FIGS. 9A and 9B are schematic representations of one variation of the dynamic interface device.
Figure 9B:
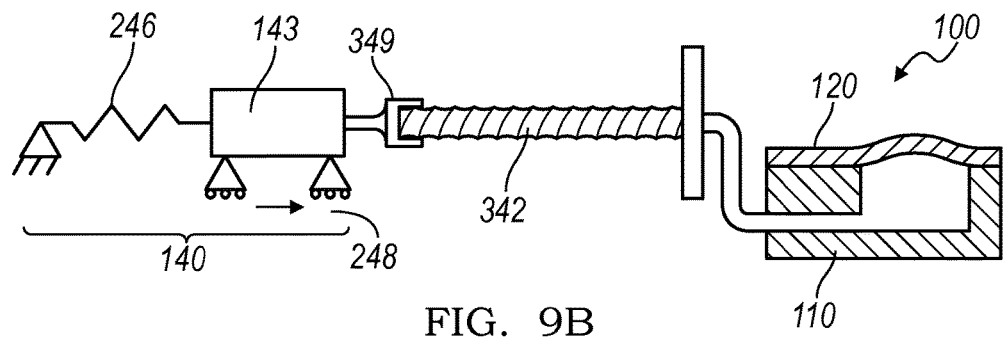

In this third variation of the dynamic tactile interface, the tube 341 can be fluidly coupled at the first end to the fluid channel 112 via a barb, junction block 343, or secondary tube, etc. to define a sealed and enclosed fluid system with the fluid channel 112, the fluid conduit 114, and the deformable region 122, as shown in FIGS. 9A and 9B. The actuator 143 of the displacement device 140 can thus twist the tube 341, thereby constricting the interior wall of the tube 341, reducing the internal volume of the tube 341, and displacing fluid out of the tube 341 and into the fluid channel 112 to transition the deformable region 122 into the expanded setting. The tube 341 can therefore be of an elastic or elastomeric material, such as silicone rubber, latex, or PVC, such that the tube 341 can be reliably and repeatedly twisted without substantial plastic (i.e. permanent) deformation.

In one example implementation, the tube 341 defines a smooth tube of a constant circular cross section and wall thickness along its length. In another example implementation, the tube 341 is internally and/or externally ribbed or corrugated, which aids the tube 341 in returning to an initial uncoiled (i.e., untwisted) state. In yet another example implementation, the tube 341 includes an elastic tubular core inset within a metallic coil spring. In a similar example implementation, the tube 341 includes a metallic coil spring encased in an elastomer to enclose an internal inside the metallic coil spring. For example, the tube 341 can include an internal or external stent configured that winds with the tube 341 and is configured to return the tube 341 to an unwound state once a torque is released from the tube 341. The tube 341 can similarly include linear and/or coiled shape memory elements embedded within a pliable tubular core of one or more elastomeric materials. For example, the tube 341 can be a silicone rubber tube with a shape-memory alloy (SMA) wire coil shallowly embedded in the external surface of the tube 341.

The tube 341 can also define a varying cross-section and/or geometry along its length to control location of an initial fold (i.e., coil) in the tube 341 as the actuator 143 begins to wind the tube 341 from a fully-uncoiled position. The cross-section and/or geometry of the tube 341 can further control propagation of folds along the tube 341 as the actuator 143 further winds the tube 341. In particular, the cross-section and/or geometry of the tube 341 can initiate a first fold at the second end of the tube 341 with each subsequent fold propagating sequentially and adjacent a previous fold as the tube 341 is wound, thereby displacing fluid fully from the second end of the tube 341 to the first end of the tube 341 and into the fluid channel 112. Such cross-section and/or geometry can substantially prevent capture of fluid between two folds in the tube 341, which may otherwise limit the maximum displacement capacity of the tube 341 and/or cause the tube 341 to rupture from increased fluid pressure between two folds.

In one example implementation, the tube 341 defines a circular cross-section along its length with a flat section of a second width on the exterior of the tube 341 at its second end. In this example implementation, the flat section tapers down to a first width less than the second width proximal the first end of the tube 341. Thus, in this example implementation, the maximum hoop stress that the tube 341 can withstand before buckling can be less at the second end than at the first end such that the tube 341 first buckles—to yield a first fold—at the second end and continues to buckle along sequential sections of the tube 341. In this example implementation, the tube 341 can define additional tapered planar sections along its exterior (and/or interior). For example, the tube 341 can define an octagonal external cross-section at the second end, which transitions into a circular external cross-section at the first end.

In another example implementation, the tube 341 defines a trough or U-shaped cross-section at the second end, which transitions into a square or circular cross-section toward the first end of the tube 341. In this implementation, the trough can create a weakest region in the tube 341 (e.g., a linear section of the tube 341 capable of a maximum hoop stress less than any other linear section of the tube 341) proximal at the second end such that the second end of the tube 341 is first to buckle or coil as the actuator 143 winds the tube 341 from a fully-unwound state.

In yet another example implementation, the tube 341 defines a circular cross-section that tapers from a first external diameter at the first end to a second external diameter less than the first external diameter at the second end. In this example implementation, the tube 341 can define a constant wall thickness along its length. Furthermore, the wall thickness of the tube 341 can taper from a first thickness proximal the first end to a second thickness less than the first thickness proximal the second end. In this example implementation, the tube 341 can thus be 'weakest' at the second end and can capable of withstanding a maximum hoop stress before buckling that increases along the length of the tube 341 from the second end toward the first end. This configuration can thus yield preferential coiling of the tube 341 starting at the second end of the tube 341 and moving linearly along the tube 341 toward the first end as the actuator 143 winds the tube 341.

In the foregoing example implementation, the internal diameter of the tube 341 can taper from a first diameter at the first end to a second diameter less than the first diameter at the second end. Alternatively, the internal diameter of the tube 341 can taper from a first diameter at the first end to a second diameter greater than the first diameter at the second end. In this implementation, the tube 341 can displace a volume of fluid 170 per coil or per linear section of the tube 341 that is greater at the second end than at the first end of the tube 341. Thus, as the actuator 143 winds the tube 341, the resolution of volume displacement from the tube 341 can increase as additional fluid is pumped out of the tube 341 and into the fluid channel 112. In particular, the actuator 143 can rotate (at substantially constant speed) to first coil the second end of the tube 341 to quickly inflate the deformable region 122 from the retracted setting and then progressively coil subsequent sections of the tube 341 toward the first end to achieve a specific volume displacement from the tube 341 with smaller and smaller volumes of fluid displaced as additional sections of the tube 341 are coiled.

In yet another implementation, the tube 341 is pinched proximal the second end. For example, the reservoir 130 can include a crimp, a clamp, or a band that constricts the tube 341 locally proximal the second end to cause the tube 341 to wind first at the second end. Alternatively, the tube 341 can be formed or reformed with a first coil proximal the second end. However, the tube 341 and/or the reservoir 130 can include any other feature or be of any other geometry to control a site of first coiling on the tube 341 when the displacement device 140 first winds to the tube 341 to transition the deformable region 122 from the retracted setting to the expanded setting.

The tube 341 can also be of a coiled geometry, such as a densely-wrapped coil or a loosely-wrapped coil. Furthermore, the tube 341 can also be housed in a substantially rigid sheath or coil that prevents the tube 341 from folding over itself when twisted and/or released. For example, the tube 341 can be arranged within an elongated housing of internal cross-section that accommodates enough offset from the tube 341 to allow the tube 341 to coil once when twisted but that prevents the coiled section of the tube 341 from coiling back on themselves. For example, the internal width and/or diameter of the housing can be approximately twice the external diameter of the tube 341. As described above, the reservoir 130 can also include a cap 349 that closes the second end of the tube 341 and functions as a junction between the tube 341 and the rotary actuator 143. For example, the cap 349 can include a crimp fitting that locks into the second end of the tube 341, and the cap 349 can further include a keyed or splined bore that slips over an output shaft 146 of the actuator 143 to transfer torque from the actuator 143 into the tube 341. However, the tube 341 can be of any other form, geometry, cross section, and/or material.

As described above, in this variation, the displacement device 140 includes a rotary actuator 143 configured to twists the tube 341, thereby displacing fluid out of the tube 341 and into the fluid channel 112. For example, the actuator 143 can include a gearhead motor with output shaft 146 coupled to the tube 341, such as via the cap. Actuation of the gearhead motor in a first arcuate direction can thus twist the tube 341, causing it to coil and reducing its internal volume. Similarly, actuation of the gearhead motor in a second—opposite—arcuate direction can unwind the tube 341, enabling fluid to flow back into the tube 341. The actuator 143 can be an electric motor, an electric gearhead motor, a rotary solenoid, a stack of doped latex tubes, or any other suitable actuator.

Alternatively, in an application of the dynamic tactile interface 100 within a computing device defining multiple configurations (e.g., a "flip phone" or a "slide phone"), a hinge, track, or other mechanism within the computing device can be coupled to the second end of the tube 341. Thus, in this application, a force or torque applied (e.g., manually) to the computing device to transition the computing device between configurations can be transmitted into the tube 341 to twist the tube, thereby transitioning the deformable region between settings. The second end of the tube 341 can also be coupled to a power transmission component that translates a manual input directly into the tube 341 to manipulate fluid into and/or out of the tube. However, the second end of the tube can be coupled to any other type of manual, electromechanical, pneumatic, or other actuator or power transmission component.

In one example implementation, the actuator 143 is mounted at a fixed distance from the first end of the tube 341 such that the length of the tube 341 remains substantially constant as it is coiled and uncoiled. Alternatively, the actuator 143 can be configured to move along a linear slide parallel to an axis of the tube 341 to accommodate a change in length of the tube 341 as the tube 341 is coiled and uncoiled, thereby limiting axial tension in the tube 341, as shown in FIGS. 9A and 9B. In this example implementation, the actuator 143 can be coupled to a spring 246 (e.g., a coil spring) that tensions the tube 341 via the actuator 143 to retract the actuator 143 once power is cut from the actuator 143 or when the actuator 143 is reversed to uncoil the tube 341 from a twisted state. For example, the spring 246 can include a coil spring coupled to the actuator 143 at a far side of the actuator 143 opposite the second end of the tube 341 and coupled to the substrate 110 opposite the first end of the tube 341. Thus, as the tube 341 coils and shrinks in length, the spring 246 can elongate, increasing tension on the tube 341 to return the tube 341 to the uncoiled state. Alternatively, the spring 246 can include a coil spring arranged over the tube 341 with its axis coincident with the axis of the tube 341, the coil spring acting directly on the rotary actuator 143. Thus, as the tube 341 coils and shrinks in length, the spring 246 can compress, increasing a restorative force applied to the actuator 143 to tension the tube 341. Similarly, a spring can be directly coupled to the second end of the tube 341 to tension the tube 341 as it is wound, and the cap 349 and include an internal or external spline. The actuator 143 can thus be coupled to the cap 349 via a splined shaft that engages the spline of the cap 349 such that the cap 349 can translate relative to the actuator 143 as the tube 341 is wound. However, for the actuator 143 than moves along a track or for the second end of the tube 341 that translates relative to the rotary actuator 143, the spring 246 can be any other suitable type of spring arranged in any other way to tension the tube 341 to return the tube 341 to an uncoiled state when the actuator 143 releases torque on the tube 341 and/or reverse in direction to uncoil the tube 341.

The displacement device 140 can also include a balance spring 247 configured to balance a torque applied by the tube 341 to an output shaft 146 of the rotary actuator 143. In particular, the balance spring 247 can apply a moment to the output shaft 146 of the actuator 143 that is substantially equal and opposite to a moment applied to the output shaft 146 of the actuator 143 for at least one uncoiled positions of the tube 341. For example, when the tube 341 is in half-coiled state (i.e., tube is wound along half of its length), the balance spring 247 can fully balance a torque applied to the output shaft 146 of the actuator 143 by the tube 341. Thus, the balance spring 247 can reduce (e.g., halve) a maximum torque that the actuator 143 must output to wind the tube 341 throughout the possible coiled and uncoiled positions of the tube 341.

In one configuration, the actuator 143 includes an electric motor with a common output shaft 146 passing through end of the motor. In this configuration, the tube 341 is coupled to output shaft 146 at a first side of the motor, and the balance spring 247 is coupled to the output shaft 146 at the opposite end of the motor and fixed at a far end remote from the first end of the tube 341 with the axis of the balance spring 247 substantially coincident with the axis of the tube 341. During installation, with the tube 341 fully unwound, the balance spring 247 can be preloaded to apply a torque to the output shaft 146 of the actuator 143 such that the balance spring 247 cancels a torque applied to the actuator by the tube 341 when the tube 341 is half-coiled. In this configuration, the balance spring 247 can include a second tube 342, such as substantially similar to the (first) tube—which contains fluid, though the second tube 342 can be devoid of fluid. Alternatively, the balance spring 247 can include a metallic coil spring, though the balance spring 247 can include any other suitable type of spring of any other suitable material.

Figure 12:
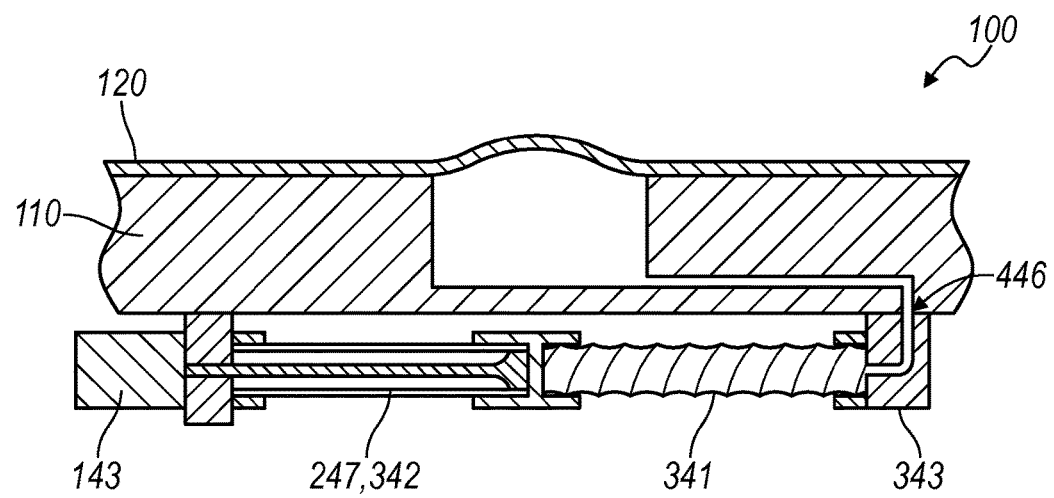
FIG. 12 is a schematic representations of one variation of the dynamic interface device.
Figure 13:
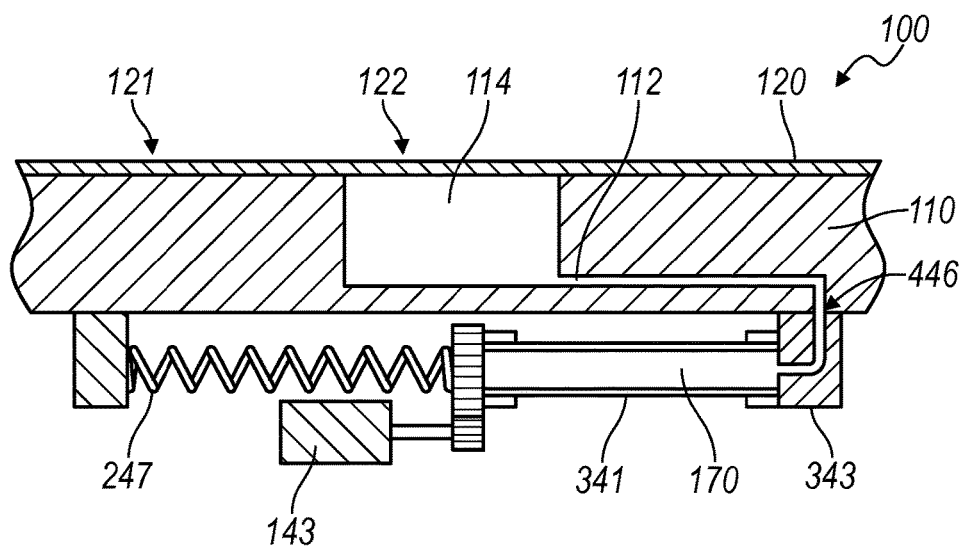
FIG. 13 is a schematic representations of one variation of the dynamic interface device.

In a similar configuration, the balance spring 247 can be directly coupled to the second end of the tube 341. For example, the cap 349 of the tube 341 can define a junction between the tube 341 and the balance spring 247. In one example implementation, the cap 349 defines a toothed gear, and the output shaft 146 of the actuator 143 is coupled to a pinion that engages the toothed gear to wind the tube 341 and the balance spring 247, as shown in FIG. 13. Alternatively, the actuator 143 can be coupled to the cap 349 of the tube 341 via a shaft that passes through the balance spring 247, as shown in FIG. 12.

In another configuration, the balance spring 247 includes a second tube 342 substantially identical to the (first) tube but, unlike the tube 341, devoid of fluid. In this configuration, the first end of the tube 341 is coupled to a junction block 343 via a barb in fluid communication with the fluid channel 112, and the second tube 342 is preloaded and similarly coupled to the junction block 343 at a first end. The output shaft 146 of the actuator 143 is further coupled directly to the cap 349 at the second end of the tube 341, and the cap 349 (or the output shaft 146) includes (or is coupled to) a first pinion that engages a second pinion coupled to a second end of the second tube 342 adjacent the second end of the (first) tube. In this example, the first and second pinions can include an identical number of gears to yield a gear ratio of 1:1. Thus, as the actuator 143 twists the (first) tube in a first direction to wind the tube 341, the second tube 342 can be equally unwound in an opposite direction to balance a torque applied to the actuator 143 by the (first) tube.

In this foregoing configuration, the balance spring 247 can alternatively include a coil spring (shown in FIG. 13), a torsion bar, or other suitable component to mechanically store energy to balance a moment applied to the actuator 143 by the tube 341, and the balance spring 247 can be geared or otherwise coupled to the tube 341 in any other way and at any other ratio control transmission of torque from the balance spring 247 into the tube 341 and/or into the rotary actuator 143.

Figure 14:
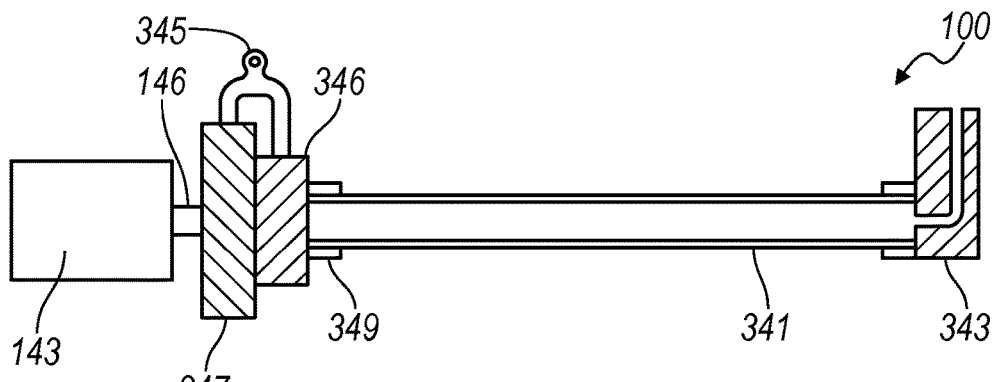
FIG. 14 is a schematic representations of one variation of the dynamic interface device.

As shown in FIG. 14, the displacement device 140 can additionally or alternatively include a ratchet and pawl mechanism configured to lock a position of the second end of the tube 341 relative to the first end of the tube 341. In particular, once a target volume of fluid 170 is displaced from the tube 341, the ratchet 346 and pawl mechanism can latch to hold the position of the second end of the tube 341 such that the power to the actuator 143 can be cut without unwinding the tube 341. In one example, the pawl 345 is coupled to the actuator housing (or to an actuator mount) via a clutch 347, and the ratchet 346 is coupled to the output shaft 146 of the actuator. In this example, with the tube 341 fully unwound, as the output shaft 146 of the actuator 143 begins to rotate in a first direction to wind the tube 341, the clutch 347 moves the pawl 345 into a lock position. As the output shaft 146 of the actuator 143 continues to rotate in the first direction the pawl 345 skips over the rotating ratchet. Once the actuator 143 stops, energy stored in the coiled tube is released as a torque applied to the output shaft 146 of the actuator 143 in a second direction opposite the first direction. However, as the tube 341 begins to unwind, the pawl 345 engages the ratchet 346 and locks the arcuate position of the ratchet 346 and thus the coiled position of the tube 341. Power to the actuator 143 can thus cease as the deformable region 122 is held in the expanded setting. To transition the deformable region 122 back to the retracted setting, the output shaft 146 of the actuator 143 can begin to rotate in the opposite direction, which causes the clutch 347 to release the pawl 345 from the ratchet 346. The tube 341 can thus unwind passively, or the actuator 143 can actively return the tube 341 to an unwound state. However, the ratchet 346 and the pawl 345 can be arranged in any other configuration and can function in any other way to latch an arcuate position of the output shaft 146 of the actuator 143 and therefore a coiled position of the tube 341.

Figure 15A:
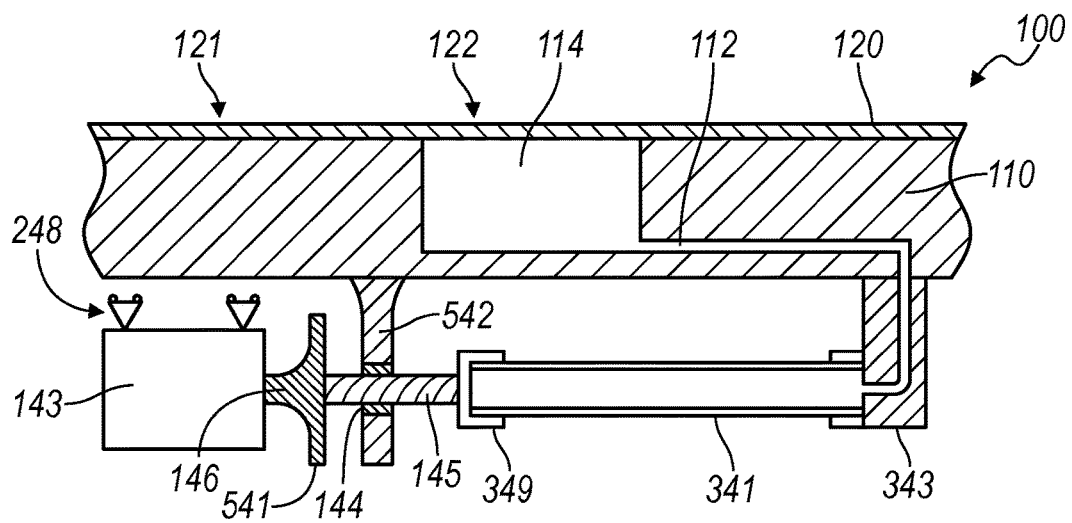
FIGS. 15A and 15B are schematic representations of one variation of the dynamic interface device.
Figure 15B:
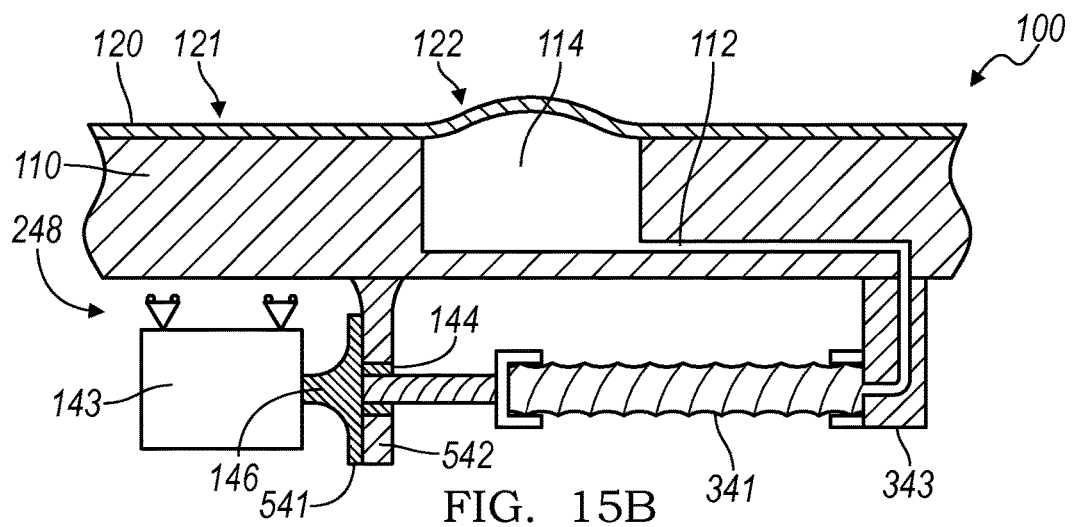

In another implementation, the displacement device 140 includes a static endplate 542 and a friction plate 541 that cooperate to lock the arcuate position of the output shaft 146 of the actuator 143 and therefore the wound position of the tube 341 in the expanded setting, as shown in FIGS. 15A and 15B. Like the pawl 345 and ratchet mechanism described above, once a target volume of fluid 170 is displaced from the tube 341, the friction plate 541 can latch to the endplate 542 to hold the position of the second end of the tube 341 such that the power to the actuator 143 can be cut without unwinding the tube 341, such as to extend a battery life of the electronic device incorporating the dynamic tactile interface. For example, the friction plate 541 can be mounting on the output shaft 146 of the actuator 143 with a threaded shaft 145 extending out away from the actuator 143 toward the second end of the tube 341. The endplate 542 can be coupled to the substrate 110 (e.g., via the touchscreen or a chassis within the electronic device) and arranged between the friction plate 541 and the tube 341 with the threaded shaft 145 engaging a threaded bore (or nut 144) passing through the endplate 542. In this example, with the tube 341 fully unwound, the friction plate 541 is offset from the endplate 542, as shown in FIG. 15A. As the output shaft 146 of the actuator 143 begins to rotate in a first direction to wind the tube 341, the threaded shaft 145 rotates in the threaded bore, advancing the friction plate 541 toward the endplate 542 according to a pitch of the threaded shaft 145 and threaded bore. As the friction plate 541 makes contact with the endplate 542, the mating surfaces bind, locking the arcuate position of the output shaft 146. The friction plate 541 and the endplate 542 thus latch the coiled position of the tube 341 to maintain the deformable region 122 in the expanded setting without sourcing additional power to hold the rotary actuator 143, as shown in FIG. 15B. To transition the deformable region 122 back to the retracted setting, the actuator 143 applies a torque to the friction plate 541 to release the friction plate 541 pawl from the endplate 542. The actuator 143 then continues to rotate in the second direction to return the tube 341 to an unwound state.

In this implementation, the initial distance between the friction plate 541 and the endplate 542 in the fully-unwound position of the tube 341 can define a preset number of rotations of the output shaft 146 before the friction plate 541 locks to the endplate 542—and therefore a preset or target number of coils or windings in the tube 341 in the expanded setting. Furthermore, in this implementation, the position of the endplate 542 and/or the position of the friction plate 541 can be set and adjusted manually. For example, a set screw can be accessed with a wrench through a external housing or body of the electronic device incorporating the dynamic tactile interface, and the set screw can be rotated to linearly translate the endplate 542 toward or away from the friction plate 541 or to adjust the arcuate position of the friction plate 541 on the threaded shaft 145. Alternatively, this adjustment can be made during initial assembly of the electronic device or after disassembly of the electronic device to tune the height, size, shape, and/or firmness, etc. of the deformable region 122 in the expanded setting, as the position of the friction plate 541 relative to the endplate 542—and therefore the number of turns of the second end of the tube 341 to drive the friction plate 541 into endplate 542—defines a maximum displacement of fluid from the tube 341. Also, in this implementation, the dynamic tactile interface can include a second endplate 542 arranged adjacent the friction plate 541 opposite the endplate 542, which can similarly define an arcuate position of the second end of the tube 341 in the retracted setting as the friction plate 541 is driven away from the endplate 542 and into the second endplate 542. However, the friction plate 541 and the endplate 542, etc. can be arranged in any other configuration and can function in any other way to latch an arcuate position of the output shaft 146 of the actuator 143 and therefore a coiled position of the tube 341 to maintain the deformable region 122 in the expanded setting.

In the foregoing variations, the dynamic tactile interface can includes a motor controller 148 (and/or processor) configured to monitor current draw of the actuator 143 and to correlate the current draw with a coiled position of the tube 341. In particular, the motor controller 148 can correlate a current draw from the actuator 143 with a volume of fluid 170 displaced from the tube 341 and control an arcuate position of the output shaft 146 of the actuator 143 accordingly. For example, the motor controller 148 (and/or processor) can implement a lookup table to associate a particular current draw or range of current draws at the actuator 143 with a particular volume of fluid 170 displacement from the tube 341. Alternatively, in the implementations above in which the dynamic tactile interface includes a friction plate 541 and an endplate 542, the motor controller 148 can correlate a rapid increase in current draw at the actuator 143 with engagement of the friction plate 541 with the endplate 542 and cut power to the actuator 143 accordingly. Similarly, the motor controller 148 can implement closed loop feedback control to move the output shaft 146 of the actuator 143 to an arcuate position associated with a minimal current draw, which can correspond to a fully-unwound state of the tube 341—and the retracted position at the deformable region 122. Additionally or alternatively, the motor controller 148 can interface with a pressure sensor fluidly coupled to he fluid channel to monitor fluid pressure with the fluid channel 112, to estimate the volume of fluid 170 displacement from the reservoir 130 accordingly, and the control the position of the actuator 143 based on the estimate fluid displacement. However, the motor controller 148 (and/or the processor) can function in any other way to control the actuator 143 to achieve a target volume displacement from the tube 341 and/or target fluid pressure within the fluid channel 112.

Furthermore, the displacement device 140 can incorporate any combination of the foregoing components or subsystems, such a pawl 345 and ratchet mechanism with a balance spring 247 or a friction plate 541 and endplate 542 with a rotary actuator 143 that translates linearly along linear track 248. However, in this variation of the reservoir 130 that includes a tube 341, the reservoir 130 and the displacement device 140 can be of any other form and/or geometry and include any other component or subsystem to displace fluid out of the reservoir 130 and into the fluid channel 112 to transition the deformable region 122 from the retracted setting to the expanded setting.

4.4 Coiled Tube Variations

In a variation similar to the foregoing, the reservoir 130 includes a linear tube coupled at a first end to an inlet of the fluid channel 112 and coupled at a second end to an outlet of the fluid channel 112, wherein the fluid conduit 114 is arranged between the inlet and the outlet of the fluid channel 112. A valve (e.g., a check valve, a one-way valve, a bi-state valve) can be arranged at each of the first end and the second end of the tube 341, and the valves can be fixed to enable fluid to fluid into the second end and out of the first end of the tube 341 such that the output shaft 146 of the actuator 143 can oscillate (e.g., clockwise 360° and then counterclockwise 360° and back) to induce flow through the tube 341. For example, the first end of the tube 341 can be fixed to the substrate 110, such as via a junction block 343, and the second end of the tube 341 can be coupled to a geared barb such that the actuator 143 can apply a torque to the barb to twist the tube 341. The tube 341, valves, and rotary actuator 143 can thus cooperate to produce continuous circulating flow. In this configuration, the displacement device can include a bi- or tri-state valve that opens one end of the tube 341 to a second reservoir or to ambient air such that the tube 341 can draw fluid or air from the second reservoir or ambient, respectively, and into the fluid channel to transition the deformable region 122 into the expanded setting. Selective actuation of the valves can also enable the displacement device to pump fluid or air out of the fluid channel and into the second reservoir or exhausted to ambient to transition the deformable region back into the retracted setting.

In a similar configuration, valves can be transiently set in a first state to enable flow only out of the tube 341. In this configuration, the tube 341 can include any of the foregoing features described above to yield preferential initial buckling and coiling of the tube 341 near its longitudinal center such that, when the actuator 143 first applies a torque to the tube 341, the tube 341 coils at its longitudinal center with additional coils subsequently forming on each side of the longitudinal center to drive fluid out of each end of the tube 341. Thus, once the deformable region 122 is fully expanded, power to the actuator 143 can be cut, as the valves prevent fluid from draining back into the tube 341. (At this stage, the actuator 143 can also be actively driven in reverse to control uncoiling of the tube 341.) To retract the deformable region 122, the state of the valves can be switched to allow fluid only to drain back into the tube 341, and the actuator 143 can also be actively driven in reverse to uncoil the tube 341, or the tube 341 can uncoil passively to draw fluid back from the fluid channel 112. Therefore, in this configuration, fluid can be pumped from the tube 341 into the multiple inlets at the substrate 110, which can yield more uniform flow of fluid through the fluid channel 112. Furthermore, for the tactile layer 120 that includes multiple deformable regions, each arranged over a fluid conduit coupled to the fluid channel 112, this configuration can further yield more uniform transition of the deformable region(s) 122 as more uniform fluid flow, higher flow rates, and/or higher fluid pressures may be enabled by the two fluid inlets over the single fluid inlet described above.

For example, in the previous configuration(s), a first valve can be arranged between ambient air and the tube, and a second valve can be arranged between the tube and the fluid channel. To pump fluid into the fluid channel to expand the deformable region, within the tube fully unwound, the first valve can be opened and the second valve closed to enable air to fill the tube. The states of the valves can then switch, and the actuator can wind the tube to displace air into the fluid channel. (The actuator can also begin to wind the tube before the valve states switch to pre-pressurize the tube.) Once the tube is sufficiently wound, the second valve to switch to a closed state to hold air in the fluid channel. To pump additional air into the fluid channel, the first valve can open and the actuator can actively or passively unwind the tube to allow additional air to fill the unwound tube. The first valve can then close, the second valve then opened, and the tube further wound to displace additional air into the fluid channel. To passively remove air from the fluid channel, the actuator can unwind the tube with the first and second valves open to exhaust air back to ambient. However, to actively pump air out of the fluid channel, the dynamic tactile interface can reverse the foregoing series of steps.

In another configuration, the second end of the tube 341 is open to ambient air, and the actuator 143 winds the tube 341 to pump air from outside the electronic device into the fluid channel 112 to transition the deformable region 122 between settings. Once wound, the tube 341 can seal air inside the fluid channel to maintain the deformable region 122 in the expanded setting, and the actuator 143 can release the tube, and the tube can unwind to release air from the fluid channel 112, thereby releasing the deformable region 122 to transition back to the retracted setting.

In the foregoing implementations, the valve(s) can be any other suitable type of valve, such as a standard electromechanical bi-state (i.e., open or closed) valve. However, the tube 341 can support fluid flow through each of its first and second ends and can cooperate in any other way with the rotary actuator 143, valve(s), etc. to displace fluid into and/or out of the fluid channel 112 to transition the deformable region 122 between settings.

Generally, manipulation of the tube as described above functions to both decrease an internal volume of the tube and to store potential energy in the wall(s) of the tube (or attached mechanical structure). In particular, by decreasing the internal volume of the tube, fluid is displaced out of the tube and into the fluid channel to transition the deformable region into the expanded setting. Furthermore, by storing energy in the wall(s) of the tube (and/or an attached mechanical structure), the tube unwinds itself once torque or tension on the tube is released, thereby returning to a larger-volume state (and drawing fluid back into the tube). The tube can therefore be manipulated as described above by twisting the tube about the tube's axis. Alternatively, the actuator can stretch the tube along its axis (or perpendicular to its axis), the internal volume of the tube thereby decreasing and the tube storing potential energy from the displacement. In this configuration, once the tube is released, energy stored in the walls of the tube can move the tube back to its original length, thereby drawing fluid back into the tube. In yet another configuration, the tube can be wound about an axis perpendicular to the axis of the tube. For example, the tube can be wound around a spool like a fire hose to displace fluid out of the tube, and the energy stored in the wall of the tube can cause the tube to unwind from the spool once torque or tension on the spool is released. However, the dynamic tactile interface can include any other actuator that manipulates the tube in any other way to change the internal volume of the tube and to store energy in the wall of the tube and/or a connected mechanical structure (e.g., a spring, etc.).

4.4 Peristaltic Pump

In a fourth variation of the dynamic tactile interface, the reservoir 130 includes any of a fluid bladder, a tube 341, a diaphragm, a bellows 245, a static vessel, or any other suitable vessel or container configured to hold fluid. The reservoir 130 is fluidly coupled to the fluid channel 112 via the displacement device 140, which includes a peristaltic pump configured to displace fluid into and out of the reservoir 130 to transition the deformable region 122 between the expanded and retracted settings, respectively.

Figure 10A:
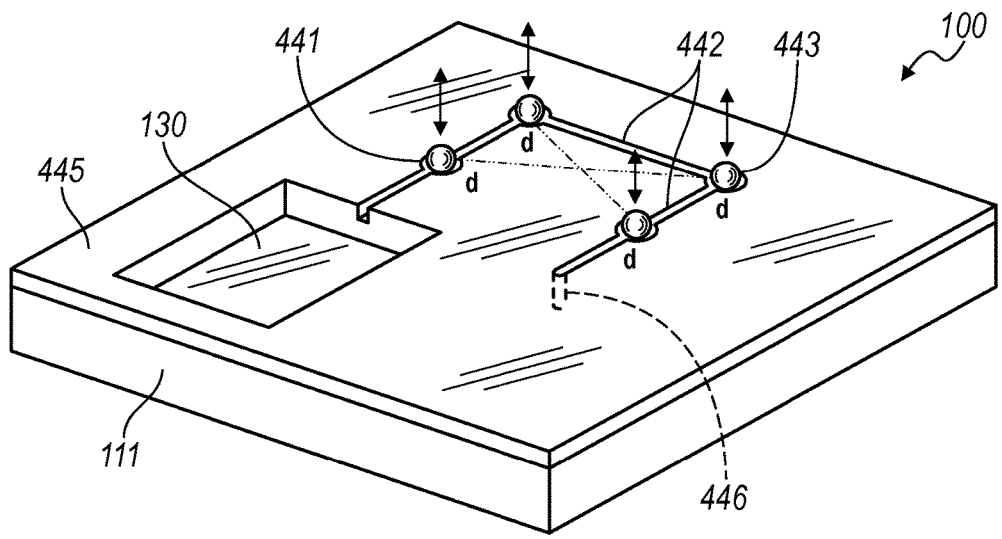
FIGS. 10A and 10B are schematic representations of one variation of the dynamic interface device.

In one example implementation, the reservoir 130 is partially defined by a portion of the substrate 110 opposite the tactile layer 120. For example, the portion of the substrate 110 can include a recessed area or valley. A first open stage channel 442 connects the portion of the substrate 110 to a first holding cavity 441 on the back surface of the substrate 110 proximal the portion of the substrate 110. A second open stage channel 442 further connects the first holding cavity 441 to a second holding cavity 441, and a third open stage channel 442 connects the second holding cavity 441 to a third holding cavity 441. The holding cavities are arranged equidistant from a common point, and the last (e.g., third) holding cavity 441 is fluidly coupled to the fluid channel 112, such as with a fluid via 446 that passes through the substrate 110 to meet the fluid channel 112, such as shown in FIG. 10A. An elastomer layer 445 bonded to the back surface of the substrate 110 encloses the portion of the substrate 110 to define the reservoir 130, encloses the open stage channels 442, and the encloses the holding cavities to create a fully-enclosed fluid system including the reservoir 130, multiple stage channels 442, multiple holding cavities, the fluid channel 112, and the cavity adjacent the deformable region 122.

Figure 10B:
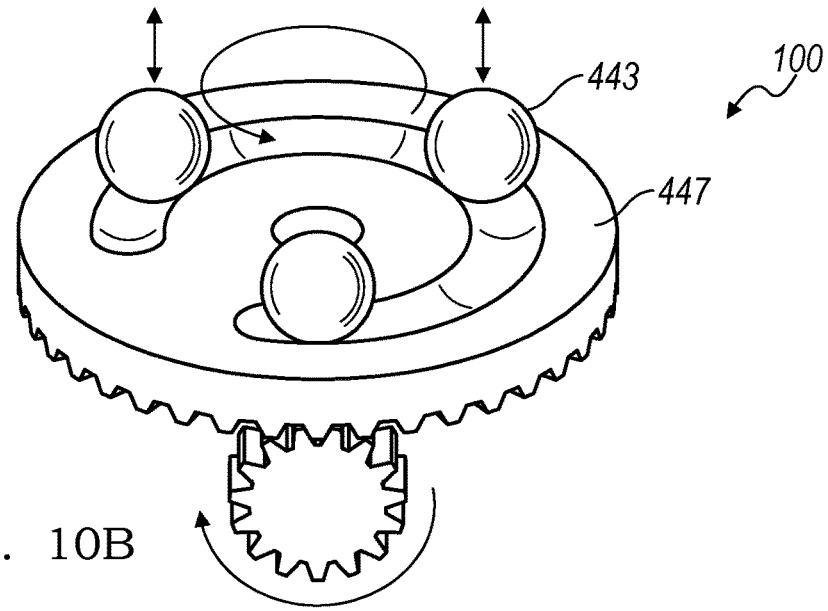

In this example implementation, the displacement device 140 further includes one tappet 443 retained over each holding cavity 441, a displacement plate 447, and a rotary actuator 143. The displacement plate 447 defines a channel in the form of a ring torus canted off-axis from an axis of rotation of the displacement plate 447, such as shown in FIG. 10B. The central diameter of the torus is sized such that the channel engages and retains each tappet 443 over a respective cavity. The actuator 143 (e.g., a gearhead motor with a bevel drive output) drives the displacement plate 447 about its axis of rotation, wherein high and low points of the torus-shaped channel contact each tappet 443 in phase, thus causing the tappets 443 to periodically and serially depress and release the elastomer layer 445 over respective holding cavities. Serial depression and release of the elastomer over the holding cavities can thus cause fluid pressure to build in the stage channels 442 between holding cavities, and timed release of tappets 443 via the displacement plate 447 can cause fluid to flow through the stage channels 442 in a continuous direction (i.e. out of the reservoir 130) as the actuator drives the displacement plate 447 in a first direction of rotation. By reversing the rotation of the actuator, the displacement device 140 can similarly change the direction of fluid flow through the system.

This example implementation of the displacement device 140 can include additional stages, such as a fourth stage with a fourth stage channel 442 that fluidly couples a fourth holding cavity 441 to the third holding cavity 441, such as shown in FIG. 10A. Like the first, second, and third stages described above, each additional stage can include a holding cavity 441 arranged at a common distance from a shared point. Furthermore, each additional stage can be sealed within the enclosed fluid system by the elastomer layer 445, and a tappet 443 can act on the corresponding holding cavity 441 through the elastomer layer 445.

The holding cavities can be hemispherical, such as with a spherical radius substantially equivalent to the sum of the spherical radius of a tappet 443 and the thickness of the elastomer layer 445, such as shown in FIG. 10B. Alternatively, the holding cavities can be cylindrical, conical, or frustoconical in geometry, or the holding cavities can be of any other suitable geometry.

The size and geometry of the tappets 443 can be matched to the size and geometry of the holding cavities and/or the thickness of the elastomer layer 445 over the holding cavities. Generally, a tappet 443 can be sized for substantially minimal clearance between the elastomer layer 445 and the corresponding holding cavity 441 such that fluid leakage past the holding cavity 441 is substantially minimized when the tappet 443 is fully depressed, such as in during a steady-state position (e.g., a fully-retracted setting, a fully-expanded setting). The tappets 443 can also be of a substantially hard material. For example, for the holding cavity 441 that is substantially hemispherical, the tappets 443 can be stainless steel or casehardened chromium-molybdenum steel ballbearings. Alternatively, the tappets 443 can be cylindrical, conical, frustoconical, or any other suitable shape to match the geometry of the holding cavities.

In a similar configuration, the displacement plate 447 is inverted and fixed with two stage channels 442 fluidly coupled to an inlet and to an outlet through the displacement plate 447. A second actuator plate is arranged over the displacement plate 447, rotates around a center of the stationary displacement plate 447, and retains tappets 443 (e.g., ball bearings) at a specific radius from the center such that the tappets 443 fall into tracks on the displacement plate 447. As the tappets 443 are forced around the stationary displacement plate 447, a moving seal is formed which forces fluid into the inlet, around the channels, and out of the outlet of the displacement plate 447. However, in various configurations of this variation, the displacement device 140 can include any other component or feature of any other suitable material or geometry and can cooperate with the substrate 110 and/or reservoir in nay other way to transition the deformable region 122 between the retracted setting and expanded setting.

In the foregoing variations, implementations, example implementations, and examples, the steady-state position of the displacement device 140 and/or actuator can yield a positive pressure (i.e., greater than atmospheric pressure) within the reservoir 130, fluid channel, and cavity in and/or during a transition into the expanded setting and a negative pressure (i.e. vacuum, or less than atmospheric pressure) within the reservoir 130, fluid channel, and cavity in and/or during a transition into the retracted setting. Positive pressure in the enclosed fluid system (relative to atmospheric pressure) in the expanded setting can enable the deformable region 122 to rise above the peripheral region 121 to create a tactilely distinguishable feature on the tactile surface. Furthermore, negative pressure in the enclosed fluid system (relative to atmospheric pressure) in the retracted setting can draw fluid out of the cavity to substantially ensure that the deformable region 122 transitions to a position that is substantially flush with the peripheral region 121 to effectively eliminate a feature tactilely distinguishable from the peripheral region 121 on the tactile surface. For example, the displacement device 140 can maintain a pressure of 15 psi above atmospheric pressure within the enclosed fluid system in the expanded setting, and the displacement device 140 can maintain a pressure of 5 psi below atmospheric pressure within the enclosed fluid system in the retracted setting. However, the dynamic tactile interface can function in any other way to transition the deformable region 122 between retracted and expanded settings.

5. Sensor and Display

As shown in FIG. 2, one variation of the dynamic tactile interface further includes a sensor 160 coupled to the substrate 110 opposite the tactile layer 120 and configured to output a signal corresponding to an input on a tactile surface of the tactile layer 120. Generally, a sensor 160 functions to enable detection on an input on the tactile surface, such as at the peripheral region 121 and/or at the deformable region 122 by outputting a corresponding signal. For example, a sensor 160 can be a capacitive touch sensor or a resistive touch sensor. A processor within the corresponding electronic device and coupled to a sensor 160 can thus interpret an output from a sensor 160 to detect a corresponding input on the tactile surface, such as from a finger or a stylus, as well as a location of the input on the tactile surface.

As shown in FIG. 2, one variation of the dynamic tactile interface further includes a display 150 coupled to the substrate 110 opposite the tactile layer 120 and configured to output an image of an input key substantially aligned with the deformable region 122. Generally, the display 150 functions to provide visual guidance at the tactile layer 120 by rendering a corresponding image, which is transmitted through the substrate 110 and the tactile layer 120 for viewing by a user. For example, the substrate 110, the tactile layer 120, and the volume of fluid 170 can be substantially transparent.

However, a sensor 160 and/or the display 150 can be implemented as described in U.S. patent application Ser. Nos. 11/969,848, 13/414,589, 13/456,010, 13/456,031, 13/465,737, and/or 13/465,772.

As a person skilled in the art will recognize from the previous detailed description and from the figures and claims, modifications and changes can be made in the foregoing embodiments of the invention without departing from the scope of this invention as defined in the following claims.

We claim:

1. A dynamic tactile interface, comprising:
    a substrate defining a fluid channel and a fluid conduit fluidly coupled to the fluid channel;
    a tactile layer comprising a peripheral region and a deformable region, the peripheral region coupled to the substrate, and the deformable region arranged over the fluid conduit, disconnected from the substrate, and operable between a retracted setting and an expanded setting, the deformable region elevated above the peripheral region in the expanded setting;
    a tube comprising a first end fluidly coupled to the fluid channel and constrained relative to the substrate;
    a volume of fluid within the tube; and
    an actuator coupled to the tube remote from the first end and configured to transition the deformable region from the retracted setting to the expanded setting by winding the tube to displace a portion of the volume of fluid within the tube into the fluid channel,
        wherein the tube comprises a second end opposite the first end, and further comprising a second tube comprising a third end coupled to the second end and a fourth end constrained relative to the substrate opposite the first end, wherein the actuator is coupled to the second end by a shaft passing through the second tube, and wherein the actuator is configured to transition the deformable region from the retracted setting to the expanded setting by rotating in a first direction to wind the tube and to unwind the second tube.

2. The dynamic tactile interface of claim 1, wherein the tube and the second tube are physically coextensive.

3. The dynamic tactile interface of claim 1, wherein the actuator is further configured to transition the deformable region from the expanded setting to the retracted setting by rotating in a second direction opposite the first direction to unwind the tube and to wind the second tube.

4. A dynamic tactile interface, comprising:
a substrate defining a fluid channel and a fluid conduit fluidly coupled to the fluid channel;
a tactile layer comprising a peripheral region and a deformable region, the peripheral region coupled to the substrate, and the deformable region arranged over the fluid conduit, disconnected from the substrate, and operable between a retracted setting and an expanded setting, the deformable region elevated above the peripheral region in the expanded setting;
a tube comprising a first end fluidly coupled to the fluid channel and constrained relative to the substrate;
a volume of fluid within the tube;
an actuator coupled to the tube remote from the first end and configured to transition the deformable region from the retracted setting to the expanded setting by winding the tube to displace a portion of the volume of fluid within the tube into the fluid channel; and
a linear track, wherein the actuator is configured to run along the track parallel to an axis of the tube, and wherein the actuator comprises an output shaft coupled to a second end of the tube opposite the first end.

5. The dynamic tactile interface of claim 4, further comprising a spring coupled to the actuator opposite the output shaft and configured to retract the actuator along the linear track to unwind the tube.

6. A dynamic tactile interface, comprising:
a substrate defining a fluid channel and a fluid conduit fluidly coupled to the fluid channel;
a tactile layer comprising a peripheral region and a deformable region, the peripheral region coupled to the substrate, and the deformable region arranged over the fluid conduit, disconnected from the substrate, and operable between a retracted setting and an expanded setting, the deformable region elevated above the peripheral region in the expanded setting;
a tube comprising a first end fluidly coupled to the fluid channel and constrained relative to the substrate;
a volume of fluid within the tube; and
an actuator coupled to the tube remote from the first end and configured to transition the deformable region from the retracted setting to the expanded setting by winding the tube to displace a portion of the volume of fluid within the tube into the fluid channel,
wherein the actuator comprises an output shaft coupled to the tube and configured to rotate in a first direction to transition the deformable region from the retracted setting to the expanded setting and to rotate in a second direction opposite the first direction to transition the deformable region from the expanded setting to the retracted setting, and further comprising a static endplate coupled to the substrate and a friction plate coupled to an output shaft of the actuator, wherein the actuary is configured to drive the friction plate into the endplate to lock the tube in a wound position corresponding to the expanded setting.

* * * * *

UNITED STATES PATENT AND TRADEMARK OFFICE
CERTIFICATE OF CORRECTION

PATENT NO.         : 9,588,683 B2
APPLICATION NO.    : 14/807750
DATED              : March 7, 2017
INVENTOR(S)        : Yairi It is certified that error appears in the above-identified patent and that said Letters Patent is hereby corrected as shown below:

In the Claims

Column 24, Line 29, Claim 6 delete "wherein the actuary is configured" and insert --wherein the actuator is configured--

Signed and Sealed this
Thirtieth Day of May, 2017

Michelle K. Lee
*Director of the United States Patent and Trademark Office*